(12) United States Patent
Ishiguro et al.

(10) Patent No.: US 6,829,953 B2
(45) Date of Patent: Dec. 14, 2004

(54) CAPACITIVE SENSOR

(75) Inventors: Katsuyuki Ishiguro, Miyagi-ken (JP); Yasuichi Ono, Miyagi-ken (JP); Kazuo Hasegawa, Miyagi-ken (JP); Daiichi Hashimoto, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/376,789

(22) Filed: Feb. 28, 2003

(65) Prior Publication Data
US 2003/0169057 A1 Sep. 11, 2003

(30) Foreign Application Priority Data
Mar. 7, 2002 (JP) ........................................ 2002-062733
Aug. 29, 2002 (JP) ........................................ 2002-251914

(51) Int. Cl.[7] .............................. G01L 1/26; G01L 1/12; G01B 7/17
(52) U.S. Cl. .............................. 73/862.52; 73/862.626; 73/780
(58) Field of Search ........................... 73/862.043, 780, 73/862.626, 862.337, 862.52

(56) References Cited

U.S. PATENT DOCUMENTS

| | | | |
|---|---|---|---|
| 5,421,213 A | | 6/1995 | Okada |
| 5,872,024 A | * | 2/1999 | Fujii et al. ..................... 438/52 |
| 6,003,371 A | * | 12/1999 | Okada ..................... 73/504.02 |
| 6,205,856 B1 | * | 3/2001 | Okada ..................... 73/504.11 |
| 6,276,207 B1 | * | 8/2001 | Sakai et al. ............... 73/514.16 |
| 6,550,331 B2 | * | 4/2003 | Fujii et al. ............... 73/514.32 |

* cited by examiner

Primary Examiner—Edward Lefkowitz
Assistant Examiner—Lilybett Martir
(74) Attorney, Agent, or Firm—Bayer, Weaver & Thomas LLP

(57) ABSTRACT

A capacitive sensor includes a fixed board provided with a fixed electrode unit consisting of one or more electrodes, a movable member provided with a movable electrode unit consisting of one or more electrodes which faces the fixed electrode unit with a gap therebetween, the movable member being rotatable with respect to the fixed board, a weight provided on the movable member, and a retaining element which is disposed between the fixed plate and the weight and retains the movable member in a rotatable manner. At least one of the movable electrode unit and the fixed electrode unit includes a plurality of electrodes.

20 Claims, 14 Drawing Sheets

CAPACITIVE SENSOR

BACKGROUND OF THE INVENTION

1. Field of the Invention

The present invention relates to capacitive sensors, and more specifically relates to a sensor structure in which tilt, acceleration, etc., can be detected on the basis of a capacitance change between a fixed electrode and a movable electrode.

2. Description of the Related Art

FIG. 14 shows a known capacitive sensor which uses a capacitance change.

The sensor shown in FIG. 14 includes a pair of plates 1000 and 1003 which face each other. Electrodes 1001 and 1002 are formed on the plate 1000, which is fixed, and an electrode 1004 is formed on the plate 1003, which is movable and has flexibility. The electrode 1004 serves as a movable electrode which rotates with respect to the fixed electrodes 1001 and 1002. In addition, a weight 1005 is attached to the flexible plate 1003, and when the sensor tilts or when an external force is applied to the sensor, the flexible plate 1003 is distorted due to the weight 1005, so that the capacitances P between the fixed electrode 1001 and the movable electrode 1004 and between the fixed electrode 1002 and the movable electrode 1004. Accordingly, the tilt, the external force, etc., is detected by determining the capacitance changes.

In the above described construction, the movable plate 1003 is initially deflected due to the weight of the weight 1005. Thus, the gap between the movable plate 1003 and the fixed plate 1000 cannot be easily maintained.

In addition, signals based on the detected capacitances include not only the capacitance changes due to the distortion of the movable plate 1003 but also offset capacitances corresponding to the capacitance increase caused by the displacement of the movable electrode 1004. The offset capacitances are large when the tilt angle θ of the sensor is small since the moving direction of the movable plate 1003 is close to the direction of gravity, and are small when the sensor is in an approximately vertical position since the moving direction of the movable plate 1003 is close to the direction perpendicular to the direction of gravity.

Accordingly, when the sensor is tilted, a capacitance Pa of a capacitor A constructed by the movable electrode 1004 and the fixed electrode 1001 and a capacitance Pb of a capacitor B constructed by the movable electrode 1004 and the fixed electrode 1002 vary in accordance with the tilt angle θ of the sensor, as shown in FIG. 15 along curves having maximum values when the tilt angle θ is about ±30°. Accordingly, when the tilt of the sensor is detected, the detection range is ±30°, which is extremely small. In addition, as shown in FIG. 15, the difference between Pa and Pb (Pa−Pb) varies along an 'S' shape having maximum and minimum values when the tilt angle θ of the senor is ±θ$_0$ (that is, ±F$_0$ in terms of the force applied to the weight 1005). The tilt angle θ$_0$, at which Pa−Pb has the maximum and minimum values is generally about 60° (although this varies with the construction of the sensor), and even when the tilt of the sensor is detected on the basis of the difference between the capacitances, the detectable angle range is about ±60°, which is still small.

In addition, when the sensor is attached to an external device, there is a problem in that the sensor cannot be attached with sufficient freedom since the detection range of the tilt angle, etc., is small.

Furthermore, since the capacitances P vary in accordance with a force applied to the weight 1005 along curves having maximum values, when the tilt angle θ is determined on the basis of a capacitance change, calculations to compensate for the capacitance change due to the vertical displacement of the movable electrode 1004 must be performed. Thus, complex calculations must be performed by using an expensive processing circuit, and the detection accuracy is degraded due to the compensation calculation.

SUMMARY OF THE INVENTION

In view of the above-described situation, an object of the present invention is to provide a capacitive sensor which can be attached with sufficient freedom and which can detect a force applied to a weight on the basis of a capacitance between a fixed electrode and a movable electrode-without compensating for the vertical displacement of a movable member.

In order to attain this object, a capacitive sensor according to the present invention includes a fixed board which is provided with a fixed electrode unit consisting of one or more electrodes; a movable member provided with a movable electrode unit consisting of one or more electrodes which faces the fixed electrode unit with a gap therebetween, the movable member being rotatable with respect to the fixed board; a weight provided on the movable member; and a retaining element which is disposed between the fixed board and the weight and retains the movable member in a rotatable manner. At least one of the movable electrode unit and the fixed electrode unit includes a plurality of electrodes, and the movement of the movable member is detected on the basis of capacitances between the one or more electrodes of the movable electrode unit and the one or more electrodes of the fixed electrode unit change in accordance with the movement of the movable member.

In the above-described construction, the movable member smoothly rotates (or seesaws) around a retaining point at which the retaining element retains the weight. Since the movable member is directly or indirectly retained by the retaining element, the movable member is not displaced due to the weight of the weight and a gap between the movable member and the fixed board is maintained constant at the retaining point irrespective of the tilt of the sensor. Therefore, the capacitance between the fixed electrode unit and the movable electrode unit changes linearly in one-to-one correspondence with the tilt angle of the sensor over the range from −90° to +90° at a maximum. In addition, even when the sensor is attached in an inclined manner, the tilt from the position at which the sensor is attached, an external force, etc., can be detected. Therefore, the sensor can be attached with sufficient freedom. In addition, since the capacitance change linearly in one-to-one correspondence with the tilt or the external force and do not have maximum values, the detection range can be increased. Furthermore, since the movable member is retained by the retaining element, the movable member is not displaced in the vertical direction. Accordingly, calculations to compensate for such a displacement can be omitted, so that the detection accuracy can be prevented from being degraded due to the compensation calculations.

The retaining element can be formed integrally with the fixed board. In such a case, the positional relationship between the retaining element and the fixed electrode unit can be set more accurately and the detection accuracy of the capacitance can be improved compared to the case in which the retaining element is formed separately. In addition, the number of components can be reduced, so that the costs can be reduced.

In this case, the movable member preferably have a concave portion for receiving an end portion of the retaining element at a position where the movable member is in contact with the retaining element. Accordingly, the retaining point at which the retaining element retains the movable member is fixed by the concave portion, so that the positional accuracy of the movable member and the fixed board can be improved. In addition, when the movable member and the fixed board are positioned such that they are parallel to each other while the sensor is in a horizontal position, that is, in a neutral state, offsets are not easily generated. Furthermore, since the movable member always rotates around the same retaining point, stable detection accuracy can be obtained.

The retaining element may also be formed integrally with the weight. In such a case, the positional relationship between the retaining point of the retaining element and the gravity center of the weight can be set more accurately. For example, when the retaining point is set such that it coincides with the gravity center of the weight in a plan view, the movable member can rotate with respect to the fixed electrode unit in a balanced manner.

In this case, the fixed board preferably have a concave portion for receiving an end portion of the retaining element at a position where the fixed board is in contact with the retaining element. Accordingly, the positional accuracy of the fixed board and the movable member can be improved and offsets are not easily generated in the neutral state. In addition, since the movable member always rotates around the same retaining point, stable detection accuracy can be obtained.

The retaining element may also be formed integrally with the movable member. In such a case, the fixed board preferably have a concave portion for receiving an end portion of the retaining element at a position where the fixed board is in contact with the retaining element. Accordingly, the positional accuracy of the movable member and the fixed board can be improved and offsets are not easily generated in the neutral state. In addition, since the movable member always rotates around the same retaining point, stable detection accuracy can be obtained.

In addition, the movable member may be biased in a direction away from the fixed board by the retaining element. In such a case, even when the sensor is turned over and the weight is positioned at the bottom side of the fixed board, the movable member does not come away from the retaining element. Accordingly, the tilt of the sensor, an external force, etc., can be detected irrespective of the orientation in which the sensor is attached.

The capacitive sensor may further include a retaining member which retains the movable member and a plurality of flexible connecting members which connect the movable member to the retaining member. In such a case, the movable member can easily rotate, so that the amount of capacitance change can be increased and the detection accuracy can be improved. Since the movable member is retained by the retaining element, the connecting members do not substantially receive the weight of the weight. Thus, the widths of the connecting members can be reduced so that the movable member can rotate more easily. Accordingly, the amount of capacitance change can be increased and the sensitivity of the sensor can be increased accordingly.

The retaining member may be placed on the fixed board. In such a case, the gap between the movable member and the fixed board is determined by the size of the retaining element. Since a spacer, etc., for providing a gap between the retaining member and the fixed board is not necessary, the number of components can be reduced. In addition, when the retaining member and the movable member are arranged in the same plane and are connected to each other with a plurality connecting members, the movable member is biased in a direction away from the fixed board by the retaining element. Thus, even when the sensor is turned over, the movable member does not come away from the retaining element. Accordingly, the tilt of the sensor, an external force, etc., can be detected irrespective of the orientation of the sensor.

The retaining member, the connecting members, and the movable member may be composed of a conductive material. In addition, a connecting electrode may be provided on the fixed board and the retaining member may be placed on the connecting electrode with or without a metal spacer therebetween. In such a case, the ground potential and electrical signals such as a drive signal can be supplied directly, or via the metal space, from the connection electrode to the movable member. Accordingly, it is not necessary to provide an additional electric line for signal supply which connects the connection electrode and the movable member, and the parasitic capacitance of such an electric line is not generated.

The capacitive sensor may further include a cover which covers the peripheral region of the fixed board and which pushes the retaining member toward the fixed board. In such a case, the sensor can be protected from dust, moisture, careless handling, etc. In addition, since the retaining member is clamped between the cover and the fixed board when the cover is fixed to the sensor, it is not necessary to apply an adhesive for fixing the retaining member. Accordingly, the assembly accuracy can be improved and productivity can be increased.

In addition, a packing may be disposed between the cover and the fixed board. In such a case, foreign matter, flux, moisture, etc., can be prevented from flowing to the inner region of the cover.

DESCRIPTION OF THE PREFERRED EMBODIMENTS

Figure 1:
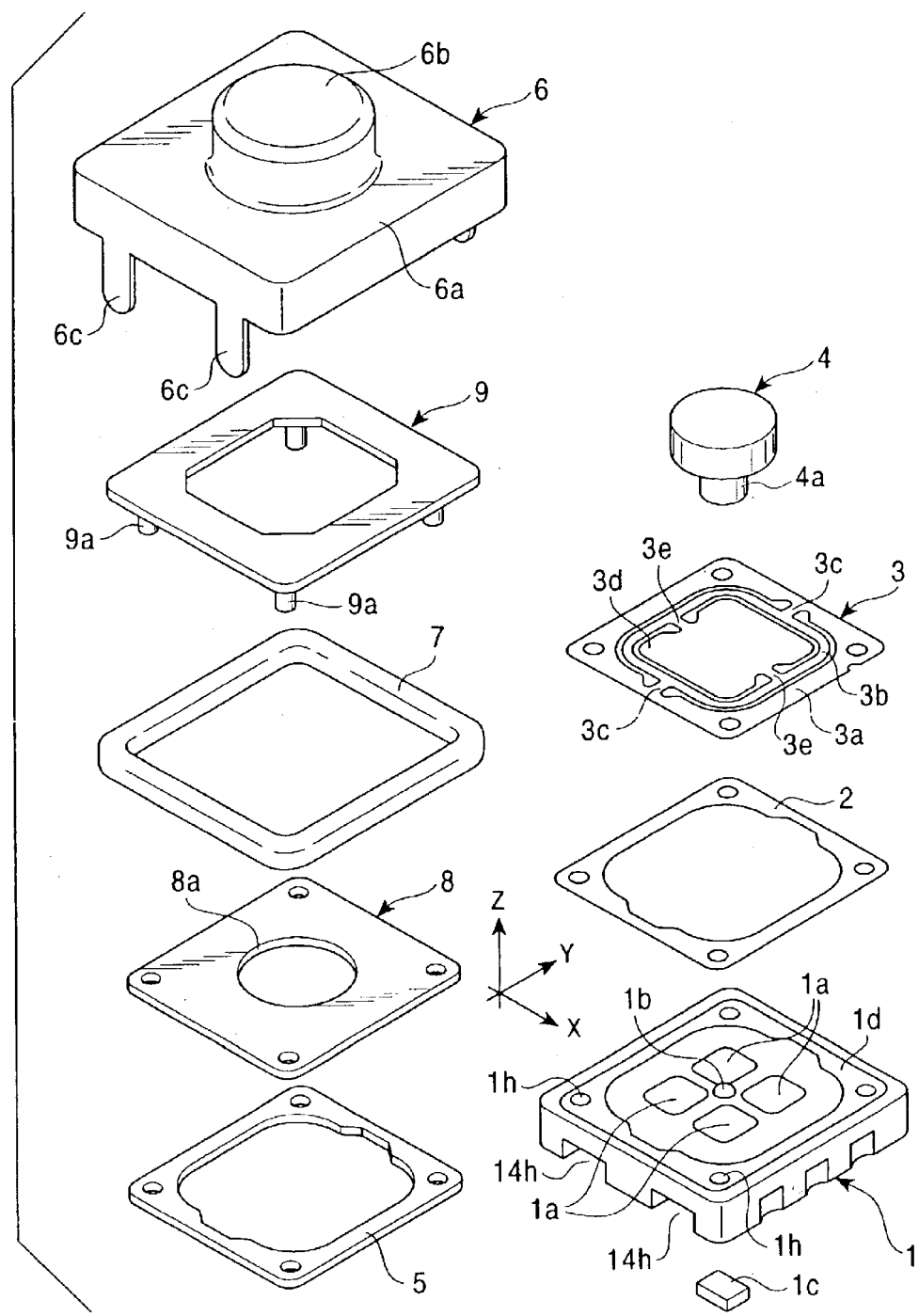
FIG. 1 is an exploded perspective view showing the overall construction of a capacitive sensor according to a first embodiment of the present invention.
Figure 2:
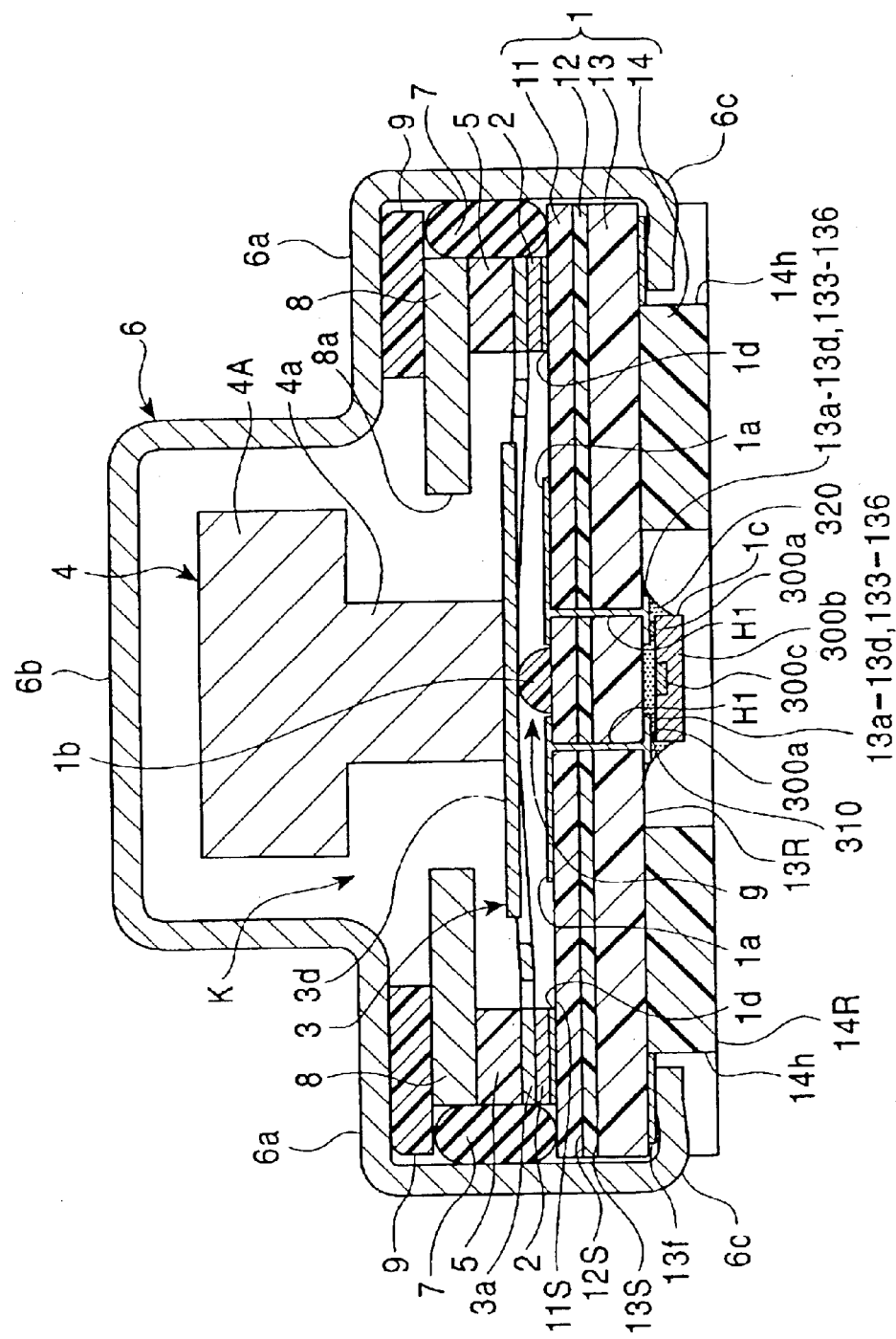
FIG. 2 is a schematic sectional view showing the overall construction of the capacitive sensor according to the first embodiment of the present invention.
Figure 3:
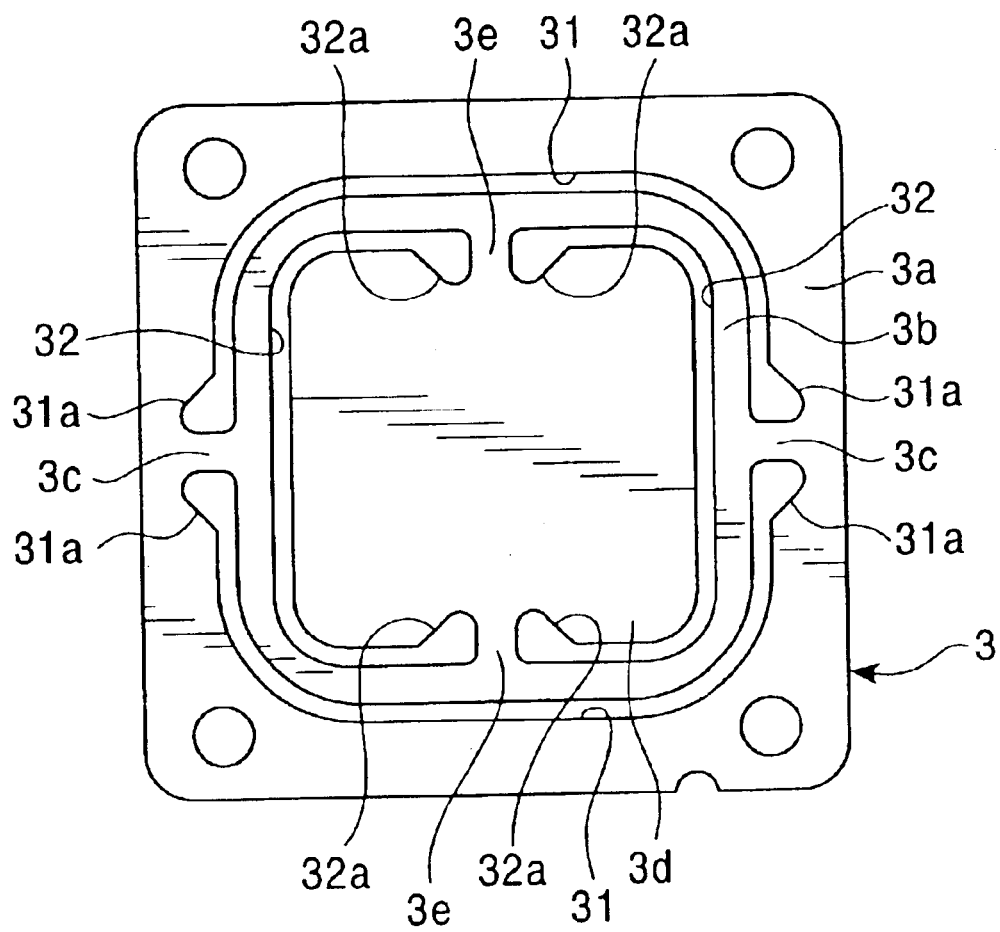
FIG. 3 is an enlarged plan view showing the construction of a retaining plate included in the capacitive sensor according to the first embodiment of the present invention.

A capacitive sensor according to a first embodiment of the present invention will be described below with reference to FIGS. 1 to 8. FIG. 1 is an exploded perspective view of the capacitive sensor according to the present embodiment, FIG. 2 is a schematic sectional view showing the overall construction of the capacitive sensor, FIG. 3 is an enlarged view of a retaining plate, which is a main component of the capacitive sensor, and FIGS. 4 to 8 are diagrams showing plates included in the capacitive sensor. In each drawing, dimensional ratios, such as thickness ratios, between the components are shown differently from the actual ratios in order to increase visibility.

With reference to FIGS. 1 and 2, the capacitive sensor according to the present embodiment includes a detector unit K for detecting electrical signals on a top surface 11S of a board 1 and a processing circuit 1c which processes the electrical signals detected by the detector unit K on a bottom surface 13R of the board 1. In the present embodiment, the detector unit K is constructed as a capacitive tilt detector which detects the tilt of the sensor as capacitance changes, and includes a plurality of electrodes 1a for capacitance detection which are formed on the top surface 11S of the board 1, a retaining plate 3 which faces the electrodes 1a, and a weight 4 which serves to twist the retaining plate 3.

The main body of the board 1 is constructed of a resin laminate composed of ceramic material or epoxy resin. A plurality of electrodes (fixed electrodes) 1a are arranged on the surface of the board 1 in a matrix pattern (four electrodes are provided in FIG. 1), and a frame-shaped electrode (connection electrode) 1d is disposed at the peripheral region of the board 1 in such a manner that the electrode id surrounds the four electrodes 1a. Since four electrodes 1a are provided, when the entire body tilts in a certain direction, the distance between the retaining plate 3 and one of the electrodes 1a increases (that is, the capacitance therebetween decreases) while the distance between the retaining plate 3 and the electrode 1a which opposes the above electrode 1a with a convex portion 1b, which will be described below, therebetween in a plan view decreases (that is, the capacitance therebetween increases). Accordingly, the direction and amount of tilt can be determined on the basis of a differential signal between them.

The electrodes 1a and 1d are electrically connected to the processing circuit 1c with through-hole electrodes H1 and H2, respectively, which penetrate through the board 1 in the thickness direction thereof.

The convex portion (retaining element) 1b has a hemispherical shape and is provided on the board 1 at the central position thereof. A conductive spacer (gap-maintaining unit) 2 which extends along the outer periphery of the board 1 is disposed on the electrode (fixed electrode) 1d. The spacer 2 and the convex portion 1b serve to maintain a constant gap between the retaining plate 3 having a gimbal structure, which will be described below, and the board 1, and thereby ensure a space in which a part of the retaining plate 3 can rotate. In addition, the spacer 2 serves to electrically connect the processing circuit 1c and a movable portion 3d.

The retaining plate 3 is flexible, and is disposed on the spacer 2. The retaining plate 3 is constructed of, for example, a thin metal plate (flat plate) which is composed of a stainless steel or the like and which has the thickness of about 50 $\mu$m. In addition, the retaining plate 3 includes a retaining portion 3a at the peripheral region thereof, and is retained by being adhered to the spacer 2. As shown in FIG. 3, the retaining portion 3a is shaped approximately like a rectangular frame, and first axial portions (first connecting members) 3c are formed such that they extend inward from the inner periphery of the retaining portion 3a at the centers of two opposing sides thereof. The inner ends of the first axial portions 3c are connected to an intermediate portion 3b. The intermediate portion 3b can rotate (or seesaw) around the axial line of the first axial portions 3c when the sensor tilts and the first axial portions 3c are twisted.

The intermediate portion 3b is also shaped approximately like a rectangular frame, and second axial portions (second connecting members) 3e are formed such that they extend perpendicularly to the first axial portions 3c from the inner periphery of the intermediate portion 3b at positions such that they oppose each other. The inner ends of the second axial portions 3e are connected to the movable portion (movable electrode) 3d. The movable portion 3d can rotate (or seesaw) around the axial line of the second axial portions 3e when the second axial portions 3e are twisted, and can also rotate (or seesaw) around the axial line of the first axial portions 3c when the intermediate portion 3b rotates (or seesaws) around the axial line of the first axial portions 3c.

In the retaining plate 3 of the present embodiment, all of the retaining portion 3a, the intermediate portion 3b, the first axial portions 3c, the movable portion 3d, and the second axial portions 3e are formed by cutting long holes in a single metal plate. Accordingly, they can be easily formed with high accuracy. More specifically, the retaining portion 3a and the intermediate portion 3b are separated from each other by first slits 31 which have an approximate 'U' shape in a plan view and which are arranged at positions excluding the positions where the first axial portions 3c are formed. In addition, the intermediate portion 3b and the movable portion 3d are separated from each other by second slits 32 which have an approximate 'U' shape in a plan view and which are arranged at positions excluding the positions where the second axial portions 3e are formed. Since the movable portion 3d is constructed of a metal plate, it serves also as a movable electrode.

In the retaining plate 3, in order to prevent plastic deformation of the axial portions 3c and 3e due to twist, notch portions 31a and 32a are formed in the retaining portion 3a and the movable portion 3d, respectively, at both ends of the slits 31 and 32, respectively, so that the lengths of the axial portions 3c and 3e are sufficiently increased to prevent the plastic deformation thereof. The notch portions 31a and 32a are not formed in the intermediate portion 3b, so that the axial portions 3c and 3e extend only into the retaining portion 3a and the movable portion 3d, respectively.

If the notch portions 31a and 32a are formed in the intermediate portion 3b, the width of the intermediate portion 3b is reduced at some parts thereof. Thus, there is a risk that stress will be concentrated at thin parts of the intermediate portion 3b and plastic deformation of the intermediate portion 3b will occur. The stress concentration easily occurs at parts of the intermediate portion 3b where the width thereof is locally reduced. Therefore, the notch portions are not formed in the intermediate portion 3b so that the intermediate portion 3b has an approximately constant width and torsional force is distributed over the entire area of the intermediate portion 3b.

A weight 4 is mounted on the movable portion 3d at the side opposite to the board 1 by, for example, adhesive bonding, electric welding, laser spot welding, crimping, etc., at the central region of the movable portion 3d. The gravity center of the weight 4 is separated from both the axial line of the first axial portions 3c and that of the second axial portions 3e in the vertical direction (that is, the gravity center of the weight 4 is at a position higher than that of the retaining plate 3). Therefore, when the sensor is tilted, a moment is applied around one or both of the axial lines in accordance with the direction of tilt. Accordingly, the first axial portions 3c and/or the second axial portions 3e are twisted, and the distances between the movable portion 3d and the four electrodes 1a change.

As shown in FIG. 2, the weight 4 has a 'T' shape in cross section and includes a head portion (upper portion) 4A, which is the main body, and a bottom portion (lower portion) 4a which is thinner than a head portion. Thus, the gravity center of the weight 4 is at a higher position compared to the case in which the bottom portion 4a and the head portion 4A has the same thickness. Accordingly, when the weight of the weight 4 is constant, the moment, which is determined on the basis of the weight of the weight 4 and the position of the gravity center, can be increased and the sensitivity to tilt can be increased accordingly.

The above-described convex portion 1b abuts against the bottom surface of the movable portion 3d, and maintains a constant gap g between the movable portion 3d and the electrodes 1a. In addition, the convex portion 1b serves to cancel the influence of downward translational accelerations such as gravity. More specifically, if the convex portion 1b is not provided, the movable portion 3d is slightly deflected toward the board 1 due to the weight of the weight 4, and the capacitances between the movable portion 3d which serves as a movable electrode and the electrodes 1a include offsets corresponding to the capacitance increase caused by the deflection (displacement) of the movable portion 3d. The offset capacitances are large when the amount of tilt of the sensor is small, and are small when the sensor is in an approximately vertical position since the amount of deflection of the movable portion 3d decreases.

Figure 15:
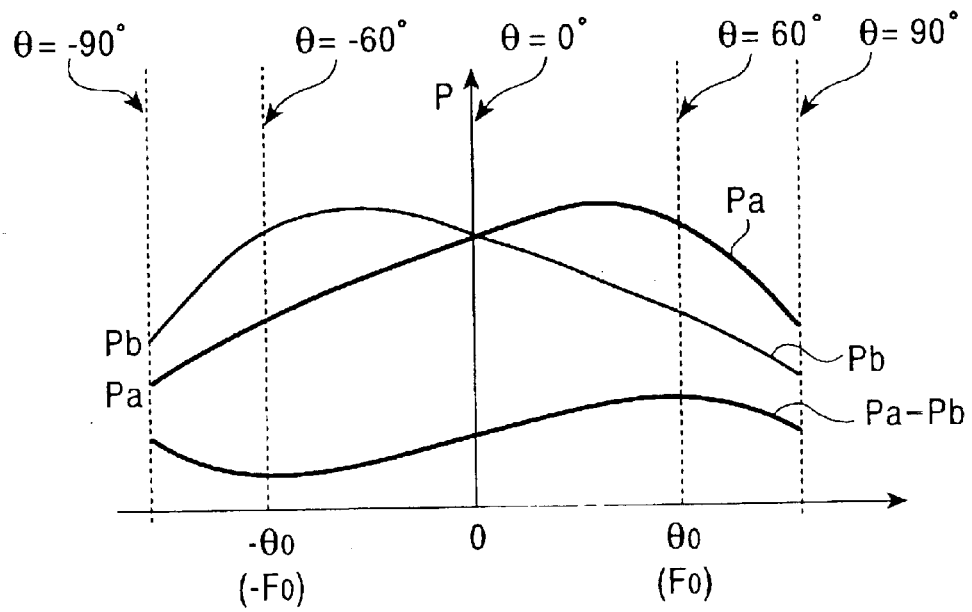
FIG. 15 is a schematic diagram showing the relationship between a tilt angle (a force applied) and capacitances in the known capacitive sensor.

In such a case, the capacitances vary along curves having maximum values in accordance with the moment applied by the weight 4, as shown in FIG. 15, and when the tilt angle of the sensor is determined on the basis of the capacitances, calculations to compensate for the vertical displacement of the movable portion 3d due to the deflection thereof must be performed. Accordingly, in the present embodiment, the deflection of the mounting portion 3d is prevented by providing the convex portion 1b which supports the mounting portion 3d at the bottom surface thereof, so that the capacitances change linearly in one-to-one correspondence with the moment over a wide range (that is, over the range of ±90° at a maximum when the movable portion 3d is biased by the convex portion 1b) and the calculation for determining the tilt angle can be simplified.

In addition, the first axial portions 3c and the second axial portions 3e do not directly receive the weight of the weight 4 unless the sensor is tilted by an extremely large amount. Accordingly, permanent deformation of the first axial portions 3c and the second axial portions 3e does not easily occur even when the widths thereof are reduced relative to the weight of the weight 4. Therefore, the widths of the axial portions 3c and 3e can be reduced without reducing the impact resistance. Since the rigidities of the axial portions 3c and 3e decrease along with the widths thereof, they are greatly deformed when the sensor is tilted and the moment is applied. Accordingly, the detection can be performed with high accuracy.

The height of the convex portion 1b is slightly greater than the total thickness of the spacer 2 on which the retaining portion 3a is disposed and the electrode 1d (in other words, the total thickness of the spacer 2 and the electrode 1d is slightly less than the height of the convex portion 1b). Accordingly, the movable portion 3d is farther from the board 1 than the retaining portion 3a is, and is biased in a direction away from the board 1 by the convex portion 1b even when the sensor is turned over and the weight 4 is at the bottom side. Since the biasing force is determined on the basis of the difference between the height of the convex portion 1b and the thickness of the spacer 2, when the gap size is set by adjusting the height of the convex portion 1b, the biasing force can be optimally set by adjusting the thickness of the spacer 2.

A frame-shaped fixing plate 5 composed of an insulating material is disposed on the retaining portion 3a, and the thin retaining plate 3 is fixed by being uniformly pushed against the spacer 2 by the fixing plate 5. In addition, a stopper 8 which serves as a rotation-restricting unit for restricting the excessive deflection of the retaining plate 3 is disposed on the fixing plate 5. The stopper 8 is constructed as a flat plate which is thicker and more rigid than the retaining plate 3, and is disposed such that the stopper 8 faces the retaining plate 3 with a gap therebetween, the gap being accurately set by the fixing plate 5. When an undesirable external force is applied to the sensor and the retaining plate 3 is deflected by a large amount, the intermediate portion 3b or the movable portion 3d knocks against the bottom surface of the stopper 8 so that the excessive rotation is restricted.

The stopper 8 has a through hole 8a through which the weight 4 extends at the central region thereof. The hole 8a is positioned inside the slits 32 formed in the retaining plate 3 (in other words, the outer periphery of the movable portion 3d is positioned outside the hole 8a) in a plan view. Thus, even when an undesirable external force is applied and the movable portion 3d is rotated by a large amount, the peripheral portion of the movable portion 3d can be prevented from being caught by the hole 8a and the retaining plate 3 can be prevented from being damaged.

The board 1, which faces the retaining plate 3 with a small gap therebetween, also helps to restrict the deflection of the retaining plate 3. In order to avoid the situation that the movable portion 3d comes into contact with the electrodes 1a and an abnormal signal is generated, the electrodes 1a are arranged such that the peripheral edges thereof are positioned inside the positions where the peripheral portion of the movable portion 3d comes into contact with the board 1 when it rotates.

A metal (conductive) cover 6 is disposed on the stopper 8 with an insulating spacer 9 therebetween. The cover 6 protects the sensor from dust, moisture, external charged objects which may cause capacitance drift, noise, careless handling, etc.

The cover 6 includes a cylindrical head portion 6b, a flange portion 6a which extends outward from the head portion 6b, and tongue-shaped tabs 6c formed at the periphery. The cover 6 is fixed to the board 1 by bending the end portions of the tabs 6c toward the bottom surface of the board 1 while the fixing plate 5 is uniformly pushed by the flange portion 6a. Since the spacer 2, the retaining plate 3, the fixing plate 5, the stopper 8, and the spacer 9 are fixed by being pushed toward the board 1 by the flange portion 6a of the cover 6, it is not necessary to apply an adhesive between these components. Thus, the assembly accuracy can be improved and productivity can be increased.

In addition, a packing 7 is fitted between the flange portion 6a and the peripheral portion of the board 1 so as to prevent foreign matter, flux, moisture, etc., from flowing to the inner region of the cover 6.

As shown in FIG. 1, a plurality of projections 9a are provided on the bottom surface of the spacer 9. The projections 9a extend through positioning holes formed in each of the stopper 8, the fixing plate 5, retaining plate 3, and the spacer 2 at positions corresponding to the projections 9a, and are fitted in recesses (holes) 1h formed in the board 1. Thus, the above-described components are accurately positioned with respect to each other.

A ground pattern (metal surface) 13f is formed on the bottom surface of the board 1 with which the tabs 6c comes into contact (see FIG. 7), and the cover 6 is grounded via the ground pattern 13f. Accordingly, the influence of external noise, etc., is eliminated. In addition, since the shape of the cover 6 is symmetric about an axial line which passes through the center of the movable portion 3d and extends perpendicularly to the movable portion 3d, initial offset capacitances are not generated. Although the cover 6 of the present embodiment has a shape such that a part of the cover 6 projects in a direction away from the electrodes 1a, the shape of the cover 6 is of course not limited to this.

The board 1 is a multilayer wiring board (rigid board) formed by laminating insulating plates 11 to 14 composed of ceramic material, epoxy resin, or the like. Top surfaces 11S to 13S of the plates 11 to 13 and bottom surfaces 13R and 14R of the plates 13 and 14 serve as a detection electrode layer, a ground layer, a power supply layer, a chip mounting surface, and a connection electrode surface, respectively.

Figure 4:
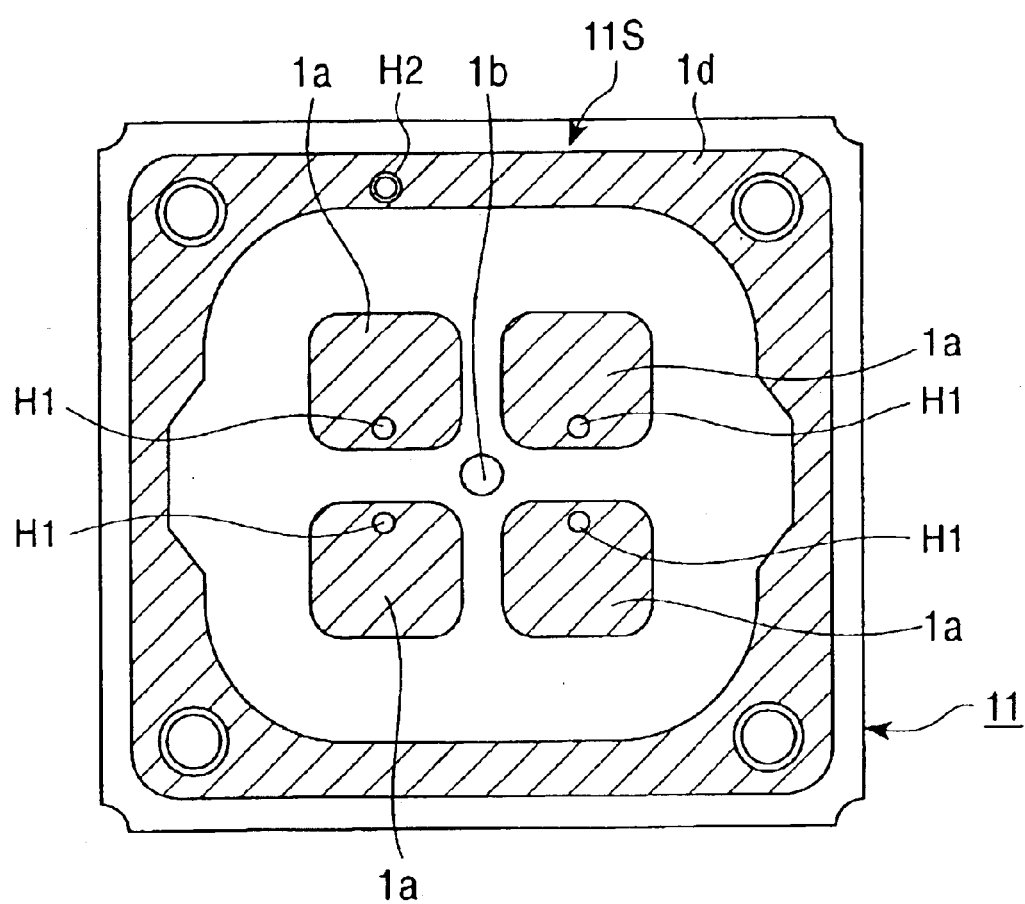
FIG. 4 is a sectional plan view showing the construction of a board included in the capacitive sensor according to the first embodiment of the present invention (a plan view of a plate);.

As shown in FIG. 4, the four electrodes 1a are formed in a matrix pattern at the central region of the detection electrode layer 11S, that is, the top surface of the board 1 (or the top surface of the plate 11) by, for example, printing a silver (Ag) pattern. In addition, the electrode id having a rectangular frame shape is formed at the peripheral region of the detection electrode layer 11S, and is electrically connected to the spacer 2.

The electrodes 1a and the electrode 1d are respectively connected to terminals 13a and 13b on the chip mounting surface 13R with through-hole electrodes H1 and H2 which extend from the detection electrode layer 11S to the chip mounting surface 13R (see FIGS. 4 to 7). The through-hole electrodes H1 and H2 are constructed by forming thin holes by laser processing or press working, filling the holes with silver paste by screen printing, and baking the silver paste. Thus, the electrodes 1a and 1d are respectively connected to the terminals 13a and 13b via the through-hole electrodes H1 and H2 over approximately the shortest distance.

Accordingly, electrical signals including detection signals and a drive signal can be transmitted to/from the processing circuit 1c without being substantially affected by electrical disturbances.

Figure 5:
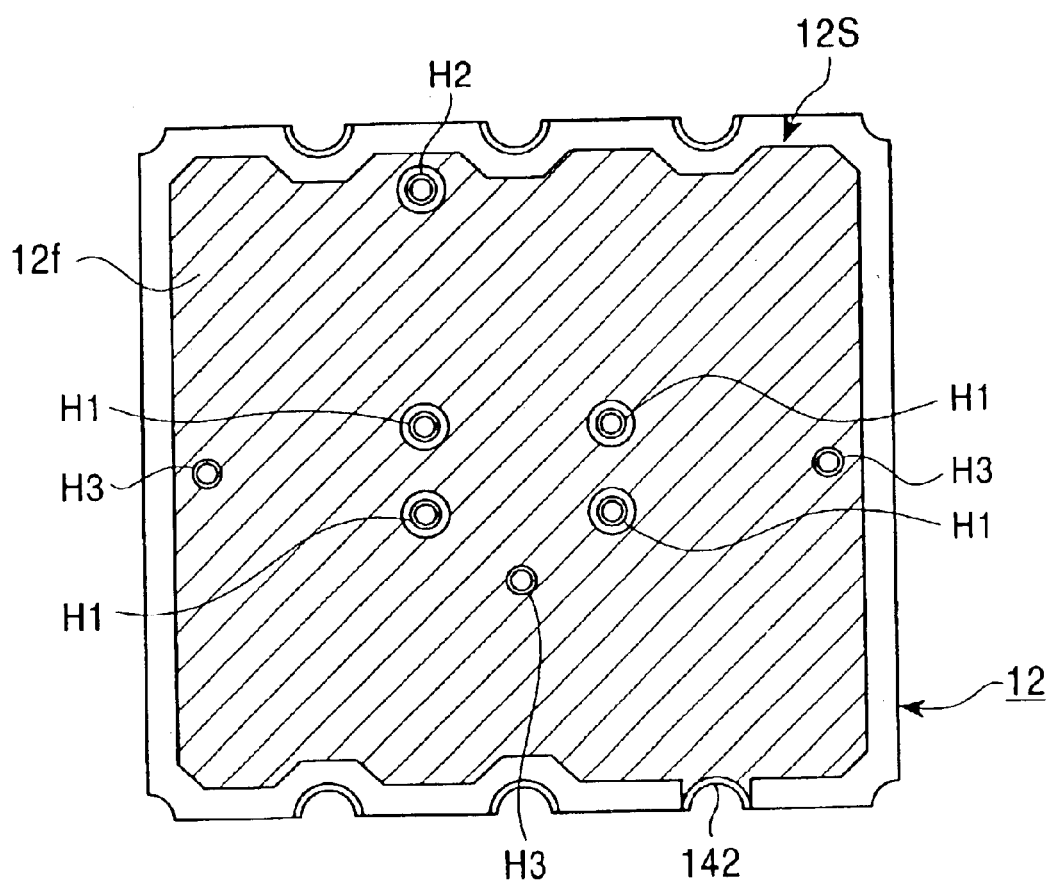
FIG. 5 is a sectional plan view showing the construction of the board included in the capacitive sensor according to the first embodiment of the present invention (a plan view of another plate)

The ground layer 12S prevents the drive signal from the retaining plate 3 composed of a metal plate from being input to the processing circuit 1c without passing through the electrodes 1a. In addition, the ground layer 12S serves as a noise shield which prevents noise from entering through the board 1 More specifically, the ground layer 12S prevents noise from reaching the detector unit K from the bottom side of the board 1, and from reaching the processing circuit 1c from the top side of the board 1. As shown in FIG. 5, approximately the entire region of the ground layer 12S excluding the through-hole electrodes H1 and H2 and the peripheral region of the plate 12 is constructed as a metal surface (conductive surface) 12f composed of, for example, silver (Ag). The metal surface 12f is electrically connected to the ground pattern 13f on the chip mounting surface 13R with a plurality of through-hole electrodes H3 which extend from the ground layer 12S shown in FIG. 5 to the chip mounting surface 13R shown in FIG. 7, and is connected to a terminal 13d. In addition, the metal surface 12f is grounded via a lead electrode 142 formed on a side surface of the board 1 (see FIG. 7). A plurality of through-hole electrodes H3 are provided in order to make the ground potential of the metal surface 12f, which serves as a ground pattern, uniform.

In order to prevent capacitive coupling with signal-detection capacitors constructed of the retaining plate 3 and the electrodes 1a, the ground layer 12S and the detection electrode layer 11S are sufficiently separated from each other. For example, the plate 11 has the thickness of, for example, about 0.4 mm. The thickness of the plate 11 is preferably 0.3 mm or more, and capacitive coupling with the detector unit K can be effectively prevented in such a case.

Figure 6:
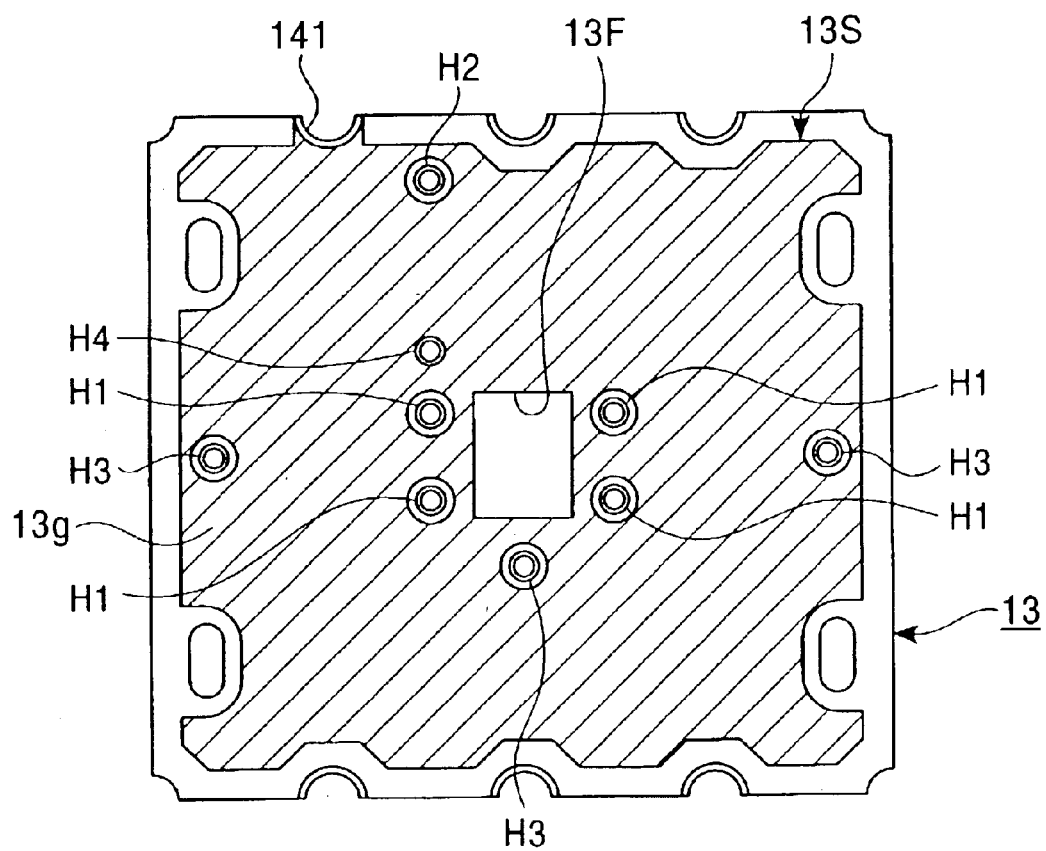
FIG. 6 is a sectional plan view showing the construction of the board included in the capacitive sensor according to the first embodiment of the present invention (a plan view of another plate)

The power supply layer 13S and the ground layer 12S serve as a bypass capacitor. As shown in FIG. 6, approximately the entire region of the power supply layer 13S excluding the through-hole electrodes H1 to H3 and the peripheral region of the plate 13 is constructed as a metal surface (conductive surface) 13g composed of, for example, silver (Ag). The metal surface 13g is connected to a terminal 13c on the chip mounting surface 13R with a through-hole electrode H4 which extends from the power supply layer 13S to the chip mounting surface 13R (see FIG. 7). In addition, the potential of the metal surface 13g is set to a power supply potential by being connected to a lead electrode 141 formed on a side surface of the board 1.

The ground layer 12S is closer to the power supply layer 13S than to the top surface (detection electrode layer) 11S of the board 1, and the power supply layer 13S and the ground layer 12S are disposed in proximity of each other. For example, a thin plate having the thickness of about 0.1 mm is used as the plate 12. Accordingly, a bypass capacitor is constructed of the ground layer 12S and the power supply layer 13S, so that it is not necessary to use an additional capacitor. Thus, the structure of the sensor can be made simpler. The thickness of the plate 12 is preferably 0.2 mm or less, and functions of a bypass capacitor can be reliably obtained in such a case.

In addition, in order to prevent capacitive coupling between the power supply layer 13S, which is more easily affected by noise compared to the ground layer 12S, and the processing circuit 1c, the metal surface 13g includes an open area 13F in which the metal pattern is not formed at the central region corresponding to the position where the processing circuit 1c is disposed.

Figure 7:
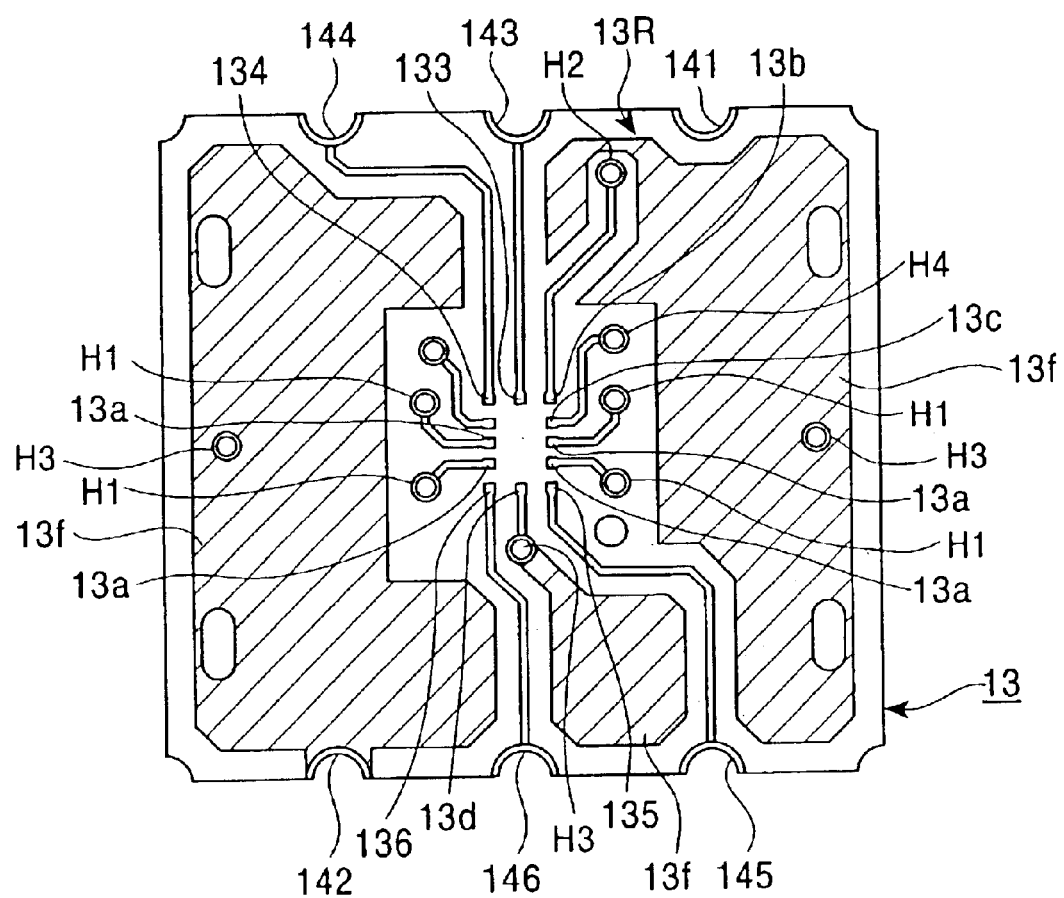
FIG. 7 is a sectional plan view showing the construction of the board included in the capacitive sensor according to the first embodiment of the present invention (a rear view of the plate shown in FIG. 6)

As shown in FIG. 7, short electric lines which serve as signal lines between the detector unit K and the processing circuit 1c and connect the through-hole electrodes H1 and H2 to the terminals (pads) 13a and 13b, respectively, are formed on the chip mounting surface 13R. In addition, electric lines which serve as output lines from the processing circuit 1c to an external device (not shown) and connect terminals (pads) 133 to 136 to lead electrodes 143 to 146, respectively, are also formed on the chip mounting surface 13R. In addition, in order to block external noise, the metal surface 13f which is composed of, for example, silver (Ag), and which serves as the ground pattern (grounding electrode) is formed at regions excluding the through-hole electrodes H1 to H4 and the electric lines connected thereto.

In order to prevent capacitive coupling with the bypass capacitor constructed of the power supply layer 13S and the ground layer 12S, the power supply layer 13S and the chip mounting surface 13R are sufficiently separated from each other. For example, the plate 13 has the thickness of, for example, about 0.2 mm, and is thicker than the plate 12. The thickness of the plate 13 is preferably 0.15 mm or more, and capacitive coupling between the processing circuit 1c and the detector unit K or between the processing circuit 1c and the above-described bypass capacitor can be effectively prevented in such a case.

Figure 8:
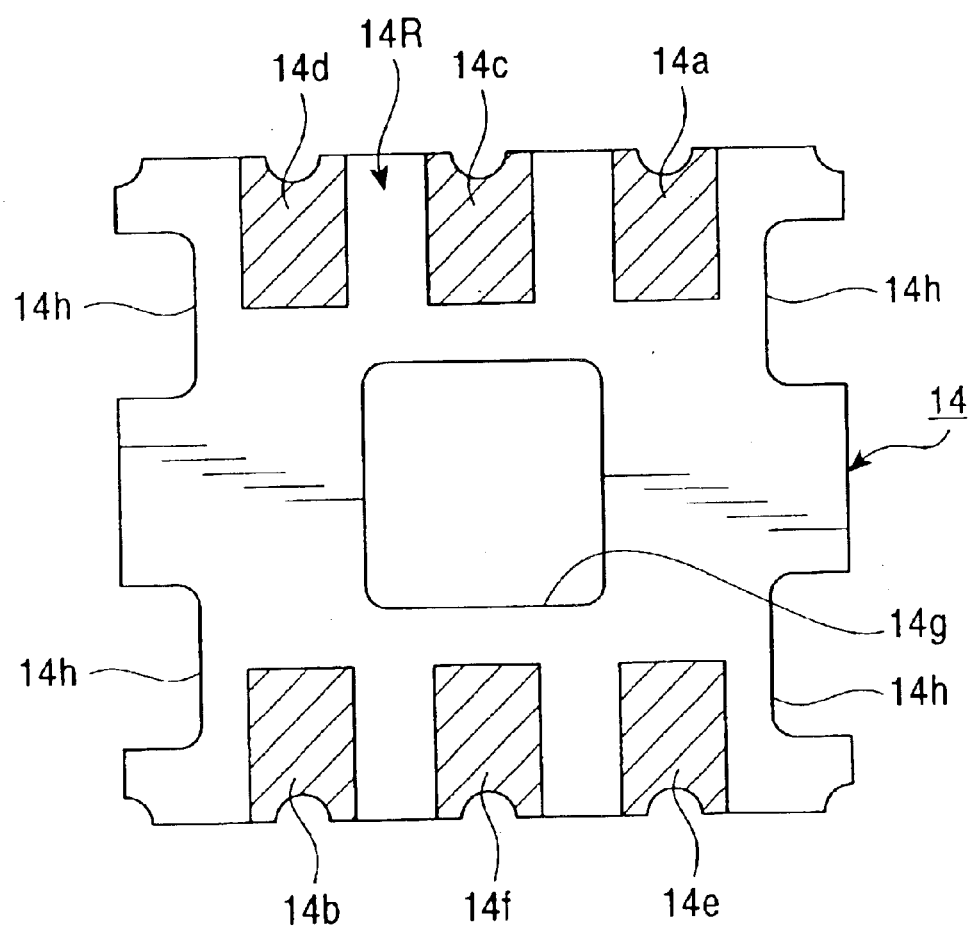
FIG. 8 is a sectional plan view showing the construction of the board included in the capacitive sensor according to the first embodiment of the present invention (a rear view of another plate)

As shown in FIG. 8, six external connection electrodes 14a to 14f are formed on the connection electrode surface 14R and are respectively connected to lead electrodes 141 to 146 formed on the side surfaces of the board 1. By soldering the connection electrode surface 14R on an external printed circuit board (PCB), the capacitive sensor can be connected to an external device (not shown) via the external connection electrodes 14a to 14f. The cover 6 and the ground layer 12S (the metal surface 12f which serves as the ground pattern) are grounded via the external connection electrode 14b, and electrical power is supplied to the power supply layer 13S (metal surface 13g) from the external device via the external connection electrode 14a. In addition, a processing result obtained by the processing circuit 1c is output to the external device via the external connection electrodes 14c to 14f.

The plate 14 has an opening 14g for receiving the processing circuit 1c at the central region thereof, and the thickness of the plate 14 is set such that the connection electrode surface 14R can be surface-mounted on the printed circuit board (PCB), that is, such that the processing circuit 1c does not protrude from the connection electrode surface 14R.

In addition, cut portions 14h for receiving the tabs 6c of the cover 6 are formed in two opposing sides of the plate 14, and parts of the ground pattern 13f on the chip mounting surface 13R face outward through the cut portions 14h. Accordingly, by crimping the end portions of the tabs 6c and bringing them into contact with the ground pattern 13f which face outward through the cut portions 14h, the cover 6 can be electrically connected to the ground pattern 13f.

The processing circuit 1c is mounted on the chip mounting surface 13R at the bottom of the board 1, and the terminals 13a and 13b for signal detection, the terminal 13c for power supply, the terminal 13d for grounding, and the terminals 133 to 136 for signal output, all of which are formed on the chip mounting surface 13R, are connected to their respective aluminum terminals 300a of the processing circuit 1c with gold bumps 310. The drive signal is applied to the retaining plate 3 via the terminal 13b for driving, and electrical signals such as voltages detected by the electrodes 1a, which are arranged so as to face the retaining plate 3, are input to the processing circuit 1c via the terminals 13a for detection. The capacitance changes in the signal-detection capacitors are determined on the basis of the thus obtained electrical signals.

Four signal-detection capacitors are constructed of the retaining plate 3 and the electrodes 1a, and the direction and amount of tilt of the capacitive sensor are calculated on the basis of the capacitance changes in these four capacitors. The calculation results are output to the external device via the terminals 133 to 136 for signal output and the external connection electrodes 14c to 14f.

The terminals (pads) 13a to 13d and 133 to 136 and the terminals 300a are preferably coated with gold in order to improve their bondability.

In the present embodiment, the processing circuit 1c is a bare integrated circuit chip. This bare chip is constructed by forming a circuit element 300c called a diffusion layer on a substrate 300b composed of a semiconductor material such as silicon (semiconductor substrate) at the central region thereof by thermal diffusion method, ion implantation method, etc. Approximately the entire region of a surface of the bare chip (processing circuit) 1c including the circuit element (diffusion layer) 300c (that is, the top surface in FIG. 1) is covered with an insulating film (not shown) composed of silicon dioxide ($SiO_2$). A plurality of aluminum (Al) patterns (not shown) are formed on the insulating film, and are electrically connected to their respective terminals 300a at one end thereof. In addition, a plurality of small through holes are formed in the insulating film at predetermined positions above the circuit element 300c, and the above-described Al patterns are connected to predetermined portions of the circuit element 300c via these through holes.

One of the Al patterns which is electrically connected to the terminal 300a which is connected to the terminal (pad) 13d for grounding by bump bonding is connected to the substrate 300b via a small hole (not shown) formed in the insulating film on the substrate 300b. Accordingly, the substrate 300b is electrically connected/to the metal surface 12f (ground layer), which serves as the ground pattern of the board 1, via the Al pattern, the terminal 300a for grounding, the gold bump 310, the pad 13d, the through-hole electrode H3, etc. Since the circuit element 300c is surrounded by the grounded substrate 300b at the bottom and sides thereof and the ground layer 12S is disposed above the circuit element 300c, the circuit element 300c is almost completely shielded and is hardly affected by external noise.

In addition, for the purpose of reinforcing, the processing circuit (bare chip) 1c is bonded to the chip mounting surface 13R with an insulating resin 320 such as epoxy resin. More specifically, the chip mounting surface 13R on which the processing circuit 1c is not yet mounted is made to face upward, and the liquid epoxy resin 320 is poured on the chip mounting surface 13R at a region surrounded by the pads with a dispenser or the like. Then, the processing circuit 1c is placed on the chip mounting surface 13R at a predetermined position such that the circuit element 300c of the processing circuit 1c faces the board 1. At this time, the epoxy resin 320 spreads beyond the region surrounded by the gold bumps 310 due to its fluidity. Then, an ultrasonic wave is applied from the back of the processing circuit 1c, so that the pads 13a to 13d and 133 to 136 are bonded to their respective terminals 300a of the processing circuit 1c with the gold bumps 310 by ultrasonic bonding. Then, the epoxy resin 320 is thermally cured so that the processing circuit 1c is bonded on the chip mounting surface 13R.

The resin 320 spreads beyond the terminals 300a and serves to protect the bonding surfaces and the terminals 300a from corrosion and the like. Although the entire region of the processing circuit 1c may be covered with the resin 320, this is not necessary since the substrate 300b is grounded. The processing circuit 1c may of course be disposed outside the sensor as in common sensors. However, since the capacitances between the movable portion 3d and the electrodes 1a are small, such as less than 1 pF (although this varies with size), it is not practicable to extend standard lead wires to the input terminals of the processing circuit 1c in view of assembly errors, movements of wires due to the tilt and capacitance variations caused by such movements, noise, aging, etc. Accordingly, when a high detection accuracy is required, the processing circuit 1c is preferably provided on the bottom surface of the board 1, so that the detection signals can be input to the processing circuit 1c over approximately the shortest distance and the influence of external noise, etc., can be minimized.

Next, the operation of the sensor will be described below. As described above, when the overall body of the sensor is tilted, the distances between the movable portion 3d and the electrodes 1a change so that the capacitances therebetween also change. Thus, the tilt of the sensor can be determined by electrically detecting the capacitance changes. More specifically, when the sensor is tilted, the weight 4 rotates around the contact point between the convex portion 1b and the movable portion 3d and applies a moment around one or both of the axial line of the axial portions 3c and the axial line of the axial portions 3e to the movable portion 3d.

The moment applied when the weight 4 tilts is separated into a torsional force around the axial portions 3c and a torsional force around the axial portions 3e, and the movable portion 3d rotates around the axial portions 3c and around the axial portions 3e independently by the amounts corresponding to the direction and angle of tilt of the sensor. The rotational center of the movable portion 3d is always separated from the board 1 by a constant distance due to the convex portion 1b, and the capacitances of the detection capacitors increase or decrease linearly in accordance with the torsional forces applied when the sensor tilts over a wide range (that is, over the range of ±90° at a maximum when the movable portion 3d is biased by the convex portion 1b). Since the weight 4 has a 'T' shape in cross section and the gravity center of the weight 4 is at a relatively high position, large torsional forces are applied. In addition, since the lengths of the axial portions 3c and 3e of the retaining plate 3 are increased due to the notch portions 31a and 32a, the rigidities of the axial portions 3c and 3e are reduced. Accordingly, even a slight tilt of the sensor causes a large rotation of the movable portion 3d with respect to the board 1.

Then, the movable portion 3d stops at an angle such that the torsional restoring forces of the axial portions 3c and 3e are balanced with the torsional forces applied to the axial portions 3c and 3e.

Due to the above-described rotation of the movable portion 3d, the capacitances of the signal-detection capacitors constructed of the movable portion 3d and the electrodes 1a change, and the capacitance changes are input to the processing circuit 1c, which is mounted at a position approximately directly below the electrodes 1a, via the through-hole electrode HI, the terminals 13a, etc. The processing result obtained by the processing circuit 1c is output to the external device via the external connection electrode 14c to 14f on the connection electrode surface 14R.

Since the retaining plate 3 is used as a common electrode, a high shielding effect can be obtained by electrically grounding the retaining plate 3.

Thus, according to the capacitive sensor of the present embodiment, the movable portion 3d is retained by the intermediate portion 3b in such a manner that the movable portion 3d can rotate around the second axis, and the intermediate portion 3b is retained by the retaining portion 3a in such a manner that the intermediate portion 3b can rotate around the first axis which extend perpendicularly to the second axis, so that the movable portion 3d can rotate around two axes independently. Accordingly, the movable portion 3d can easily rotate and the displacement of the movable portion 3d with respect to the electrodes 1a during the rotation can be increased compared to a known capacitive sensor in which capacitances are changed simply by using the elastic distortion of a flexible plate. Therefore, the displacement of the movable portion 3d around two axes due to tilt, etc., can be detected by a single sensor with high sensitivity.

In addition, since the bottom portion 4a of the weight 4 is thinner than the head portion 4A, which is the main body of the weight 4, the gravity center of the weight 4 is at a higher position compared to the case in which the bottom portion 4a and the head portion 4A has the same thickness. Accordingly, a large moment can be applied to the retaining plate 3 and the sensitivity can be increased. In addition, in this case, the position of the gravity center of the weight 4 changes along with the weight ratio between the head portion 4A and the bottom portion 4a. Therefore, when the weight of the weight 4 is constant, the moment applied to the retaining plate 3 can be increased by increasing the weigh ratio of the head portion 4A to the bottom portion 4a. Accordingly, the sensitivity can also be increased. In addition, when the moment is constant, the weight of the weight 4 can be reduced, so that the impact resistance of the sensor can be increased. Furthermore, when the thickness of the bottom portion 4a is reduced, the bonding area between the bottom portion 4a and the movable portion 3d can also be reduced, and there is more freedom in the design of the retaining plate 3.

As described above, the lengths of the axial portions 3c and 3e are increased by forming the notch portions 31a and 32a in the retaining portion 3a and the movable portion 3d, respectively, at both ends of the first slits 31 and the second slits 32, respectively. Accordingly, plastic deformation of the axial portions 3c and 3e does not easily occur when they are twisted, and the amount of rotation can be increased. The notch portions 31a and 32a are formed only in the retaining portion 3a and the movable portion 3d, respectively, so that the intermediate portion 3b has a constant width. Accordingly, the torsional force can be uniformly distributed over the entire area of the intermediate portion 3b, and plastic deformation of the intermediate portion 3b due to stress concentration can be prevented. Therefore, even when the width of the intermediate portion 3b is reduced to increase the amount of deflection of the retaining plate 3, plastic deformation of the intermediate portion 3b does not easily occur, so that the sensitivity can be increased without reducing the impact resistance.

In addition, since the peripheral portion and the central portion of the retaining plate 3 are retained by the spacer 2 and the convex portion 1b, respectively, a constant gap can be maintained between the retaining plate 3 and the electrodes 1a. In particular, since the movable portion 3d is supported by the convex portion 1b at the bottom side thereof, it can be prevented from being deflected toward the board 1 due to the weight of the weight 4. Accordingly, the tilt of the sensor, etc., can be calculated without taking the vertical displacement of the movable portion 3d due to the weight of the weight 4 into account (that is, without performing the calculations to compensate for the vertical displacement of the movable portion 3d). Therefore, the calculation for determining the tilt, etc., can be simplified and the detection accuracy can be improved.

In addition, since the height of the convex portion 1b is larger than the total thickness of the spacer 2 and the electrode 1d, the intermediate portion 3b is deformed such that it is displaced upward from the first axial portions 3c toward the second axial portions 3e. The intermediate portion 3b constantly pushes the movable portion 3d against the convex portion 1b, so that a preload is applied to the movable portion 3d. Therefore, even when the sensor is turned over and the weight of the weight 4 is applied, the intermediate portion 3b is continuously pushed against the convex portion 1b. Accordingly, the gap between the movable portion 3d and the board 1 at the contact point between the movable portion 3d and the convex portion 1b is reliably maintained constant, and tilt of a sensor can be detected irrespective of the sensor in which the sensor is attached. Furthermore, even when the sensor is rotated while it is being used, the movable portion 3d and the convex portion 1b do not repeatedly knocking against each other, so that they can be prevented from being deformed or damaged.

The above-described biasing force is determined on the basis of the difference between the total thickness of the spacer 2 and the electrode 1d and the height of the convex portion 1b. Therefore, when, for example, the gap g is set by adjusting the height of the convex portion 1b, the biasing force can be-adjusted independently of the gap g by changing the thickness of the spacer 2. By adjusting the height of the convex portion 1b and the thickness of the spacer 2 independently, the sensitivity of the sensor which is determined by the gap g can be increased and the stability of the state in which the movable portion 3d is retained can be improved at the same time.

In addition, since predetermined electric signals are supplied to the movable portion 3d via the spacer 2, it is not necessary to provide an additional electric line for signal supply, so that the parasitic capacitance of such an electric line is not generated.

Figure 9:
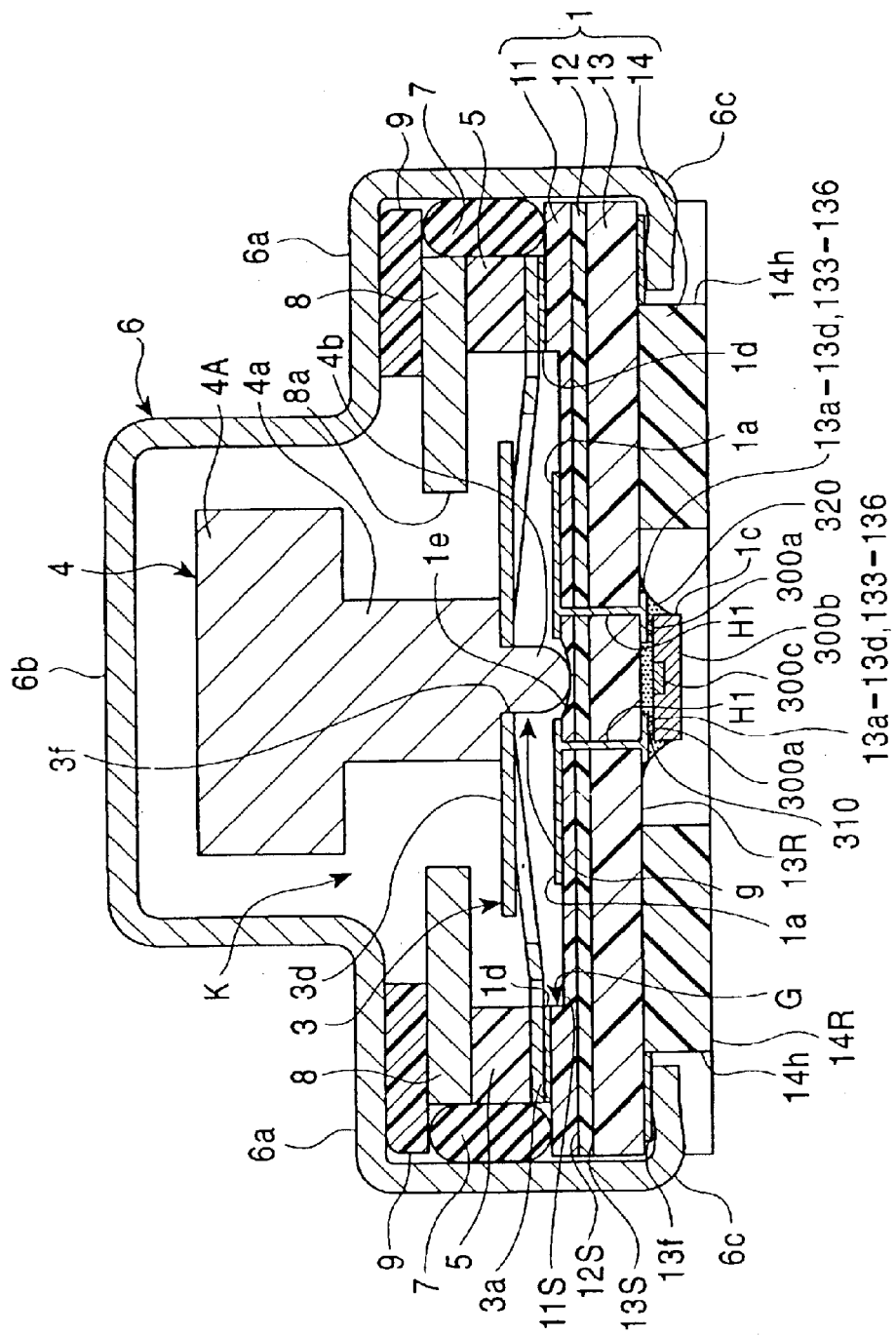
FIG. 9 is a schematic sectional view corresponding to FIG. 2, showing the overall construction of a capacitive sensor according to a second embodiment of the present invention.

Next, a capacitive sensor according to a second embodiment of the present invention will be described below with reference to FIG. 9. The capacitive sensor of the present embodiment is different from that of the first embodiment in that the convex portion 1b is omitted, and a projection (retaining element) 4b is provided on the bottom portion 4a of the weight 4 in place of the convex portion 1b. The projection 4b is formed uniformly with the weight 4, and extends through a hole 3f formed in the movable portion 3d at the central region thereof and is in contact with the board 1 at the central position of the four electrodes 1a. The projection 4b serves to maintain a constant gap between the movable portion 3d and the board 1, and the movable portion 3d rotates around the contact point (retaining point) between the projection 4b and the board 1.

In addition, a concave portion 1e for receiving the end portion of the projection 4b is formed in the board 1 at the central position of the four electrodes 1a, so that the retaining point at the end of the projection 4b is fixed (restrained) such that it does not move in the planar direction. The concave portion 1e is centered on the gravity center of the weight 4 in a plan view, so that the weight 4 is supported by the projection 4b in such a manner that the gravity center thereof is directly above the projection 4b.

In addition, the retaining portion 3a of the retaining plate 3 is directly laminated on the electrode id, and the central portion of the movable portion 3d is retained by the projection 4b in such a manner that the movable portion 3d is biased in a direction away from the board 1. Accordingly, the weight 4 attached to the movable portion 3d is constantly pushed against the board 1, and even when the sensor is turned over and the weight of the weight 4 is applied, the end portion of the projection 4b is continuously pushed against the board 1.

The rigid board 1 is formed by resin molding and also serves the function of the spacer 2. More specifically, the retaining portion 3a of the retaining plate 3 is disposed on the board 1, and the electrodes 1a are formed on the surface of a step portion (recessed portion) G.

Accordingly, functions similar to those of the convex portion 1b of the first embodiment can also be obtained by the construction of the present embodiment. In addition, since the weight 4 is supported on the board 1 by the projection 4b, which is formed integrally with the weight 4 and serves as the retaining element, the positional relationship between the retaining point of the projection 4b (that is, the contact point between the projection 4b and the board 1) and the gravity center of the weight 4 can be set more accurately.

In addition, since the retaining point, which serve as the rotational center of the weight 4, is restrained such that it does not move in the planar direction from the position which coincides with the gravity center of the weight 4 in a plan view, the movable portion 3d and the board 1 are parallel to each other when the sensor is in a horizontal position, that is, in a neutral state. Accordingly, offset signals are not generated and the movable portion 3d can rotate with respect to the fixed electrodes 1a in a balanced manner, so that the amount of rotation of the movable portion 3d due to an external force is constant irrespective of the direction from which the external force is applied. Therefore, a constant sensitivity can be obtained irrespective of the direction of tilt (that is, the direction of force).

In addition, according to the present embodiment, the spacer 2, which is disposed between the electrode id and the retaining portion 3a in the construction of the first embodiment, is omitted, so that the number of components and assembly processes are reduced. Thus, the manufacturing costs can be reduced.

Figure 10:
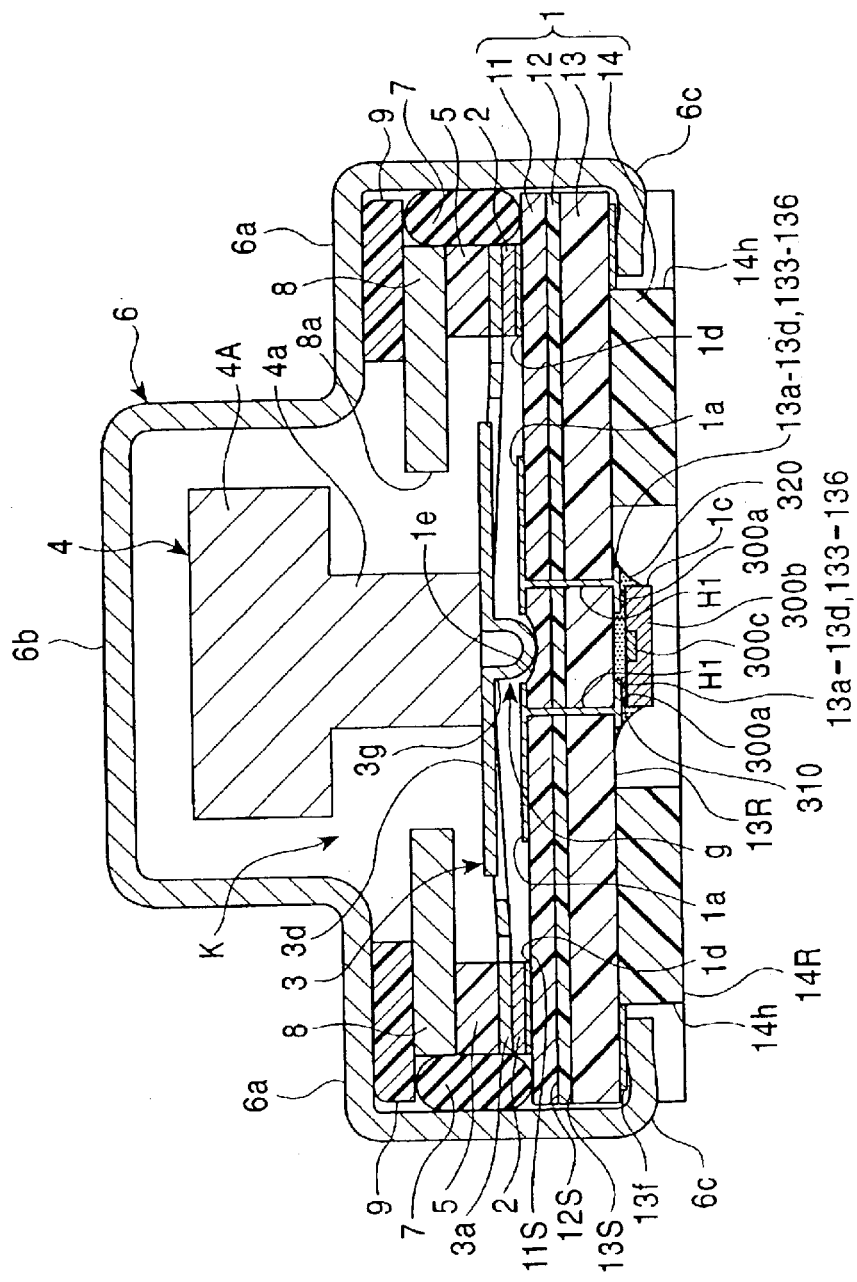
FIG. 10 is a schematic sectional view corresponding to FIG. 2, showing the overall construction of a capacitive sensor according to a third embodiment of the present invention.

Next, a capacitive sensor according to a third embodiment of the present invention will be described below with reference to FIG. 10. The sensor of the present embodiment is constructed similarly to that of the first embodiment, but the convex portion 1b which projects from the board 1 is omitted and a convex portion (retaining element) 3g which has a round surface at the end thereof and which projects toward the board 1 is formed at the central region of the movable portion 3d by press working, etc., in place of the convex portion 1b. The convex portion 3g separates the movable portion 3d and the board 1 from each other by a constant distance, and the movable portion 3d rotates around the contact point between the convex portion 3g and the board 1.

In addition, a concave portion 1e for receiving the end portion of the convex portion 3g is formed in the board 1 at the central position of the four electrodes 1a, so that the retaining point at the end of the convex portion 3g is restrained such that it does not move in the planar direction. The concave portion 1e is centered on the gravity center of the weight 4 in a plan view, so that the weight 4 is supported by the convex portion 3g in such a manner that the gravity center is directly above the convex portion 3g.

Other constructions are similar to those of the first embodiment, and explanations thereof are thus omitted.

Accordingly, effects obtained by the first embodiment can also be obtained by the present embodiment. In addition, since the retaining point at the end of the convex portion 3g is fixed at a position which coincides with the gravity center of the weight 4 in a plan view, offset signals are not generated in a neutral state, and the movable portion 3d can rotate with respect to the fixed electrodes 1a in a balanced manner. Accordingly, the amount of rotation of the movable portion 3d due to force is constant irrespective of the direction from which the force is applied. Therefore, a constant sensitivity can be obtained irrespective of the direction of tilt (that is, the direction of force). In addition, when the convex portion 3g is formed by press working, there is an advantage in that it can be manufactured easily.

Although the convex portion 3g is formed integrally with the retaining plate 3 in the present embodiment, the convex portion 3g may also be formed separately from the retaining plate 3 and be adhered to the bottom surface of the flat movable portion 3d.

Figure 11:
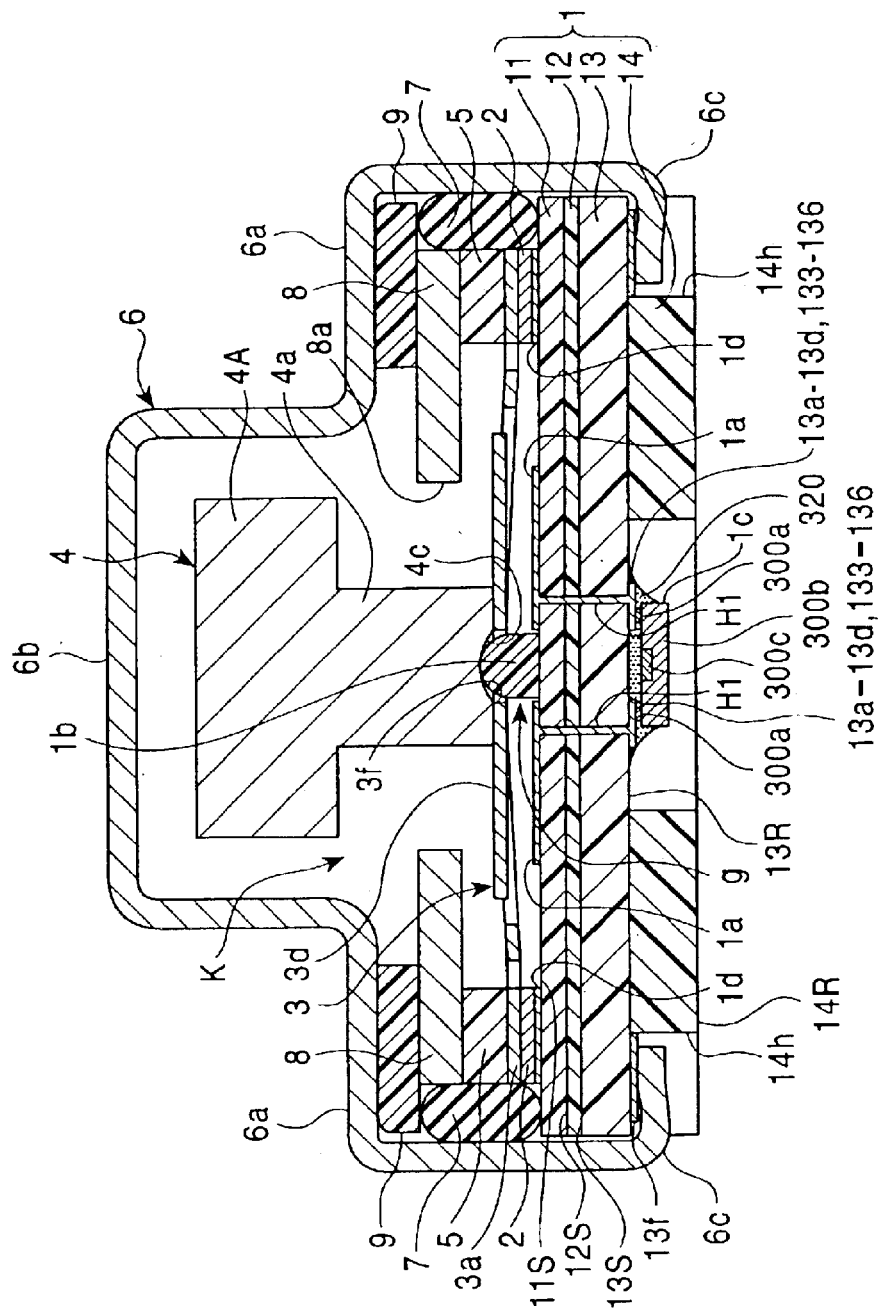
FIG. 11 is a schematic sectional view corresponding to FIG. 2, showing the overall construction of a capacitive sensor according to a fourth embodiment of the present invention.

Next, a capacitive sensor according to a fourth embodiment of the present invention will be described below with reference to FIG. 11. The sensor according to the present embodiment is constructed similarly to that of the first embodiment, but the weight 4 is directly supported by the convex portion 1b at the bottom surface thereof. More specifically, the height of the convex portion 1b is increased compared to that of the first embodiment, and the convex portion 1b extends through a hole 3f formed in the movable portion 3d and abuts against the weight 4 which is mounted on the movable portion 3d. The movable portion 3d to which the weight 4 is adhered is separated from the board 1 by a constant distance, and rotates around the contact point (retaining point) between the convex portion 1b and the weight 4.

In addition, a concave portion 4c for receiving the convex portion 1b is formed in the bottom surface of the weight 4 at the central region thereof, so that the retaining point at which the convex portion 1b retains the weight 4 is restrained such that it does not move in the planar direction. The concave portion 4c is centered on the gravity center of the weight 4 in a plan view, so that the retaining point coincides with the gravity center of the weight 4 in a plan view.

Accordingly, effects obtained by the first embodiment can also be obtained by the present embodiment. In addition, since the retaining point at which the convex portion 1b retains the weight 4 is restrained at a position which coincides with the gravity center of the weight 4 in a plan view, offset signals are not generated in a neutral state, and a constant sensitivity can be obtained irrespective of the direction of force.

Figure 12:
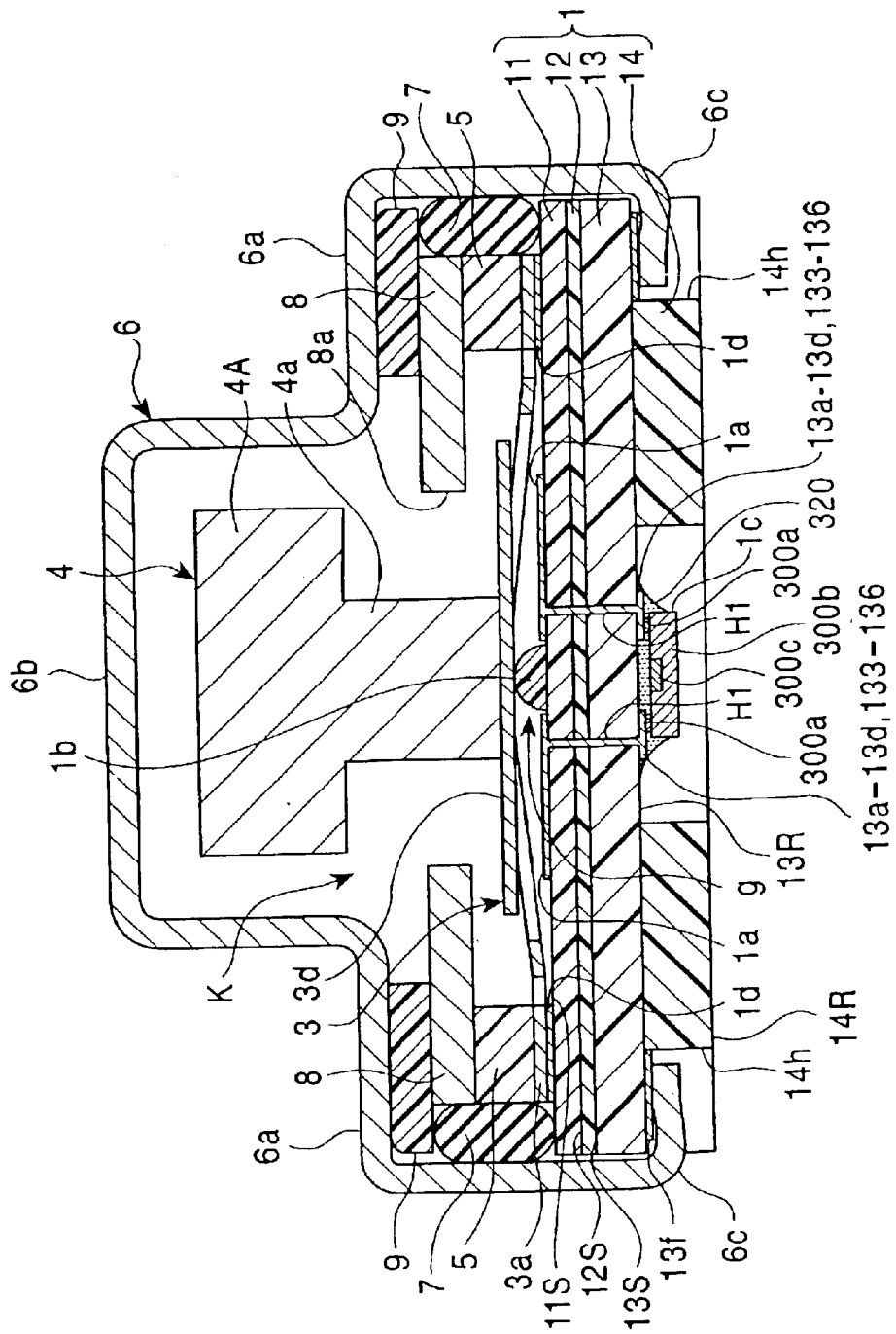
FIG. 12 is a schematic sectional view corresponding to FIG. 2, showing the overall construction of a capacitive sensor according to a fifth embodiment of the present invention.

Next, a capacitive sensor according to a fifth embodiment of the present invention will be described below with reference to FIG. 12. The sensor according to the present embodiment is constructed similarly to that of the first embodiment, but the spacer 2 is omitted. More specifically, the retaining portion 3a of the retaining plate 3 is disposed directly on the electrode 1d, and the movable portion 3d and the weight 4 attached to the movable portion 3d are continuously pushed against the convex portion 1b formed on the board 1. Other constructions are similar to those of the first embodiment, and explanations thereof are thus omitted.

Accordingly, effects obtained by the first embodiment can also be obtained by the present embodiment. In addition, since the retaining portion 3a of the retaining plate 3 is directly attached to the electrode 1d on the board 1 without disposing a spacer therebetween, the movable portion 3d is retained such that the central portion thereof is biased in the direction away from the board 1 due to the convex portion 1b by a larger force compared to the construction of the first embodiment. Therefore, even when the sensor is turned over and the weight of the weight 4 is applied, the intermediate portion 3b can be strongly pushed against the convex portion 1b on-the board 1. In the present embodiment, the retaining plate 3 is retained in such a manner that the central portion the of is largely deflected. However, since this deflection is absorbed by the axial portions 3c and 3e and the intermediate portion 3b, the peripheral portion of the movable portion 3d is not deflected so much as to degrade the sensor characteristics.

Furthermore, since the spacer, which is disposed between the retaining portion 3a and the electrode 1d in the first embodiment, is omitted, the costs can be reduced.

Figure 13:
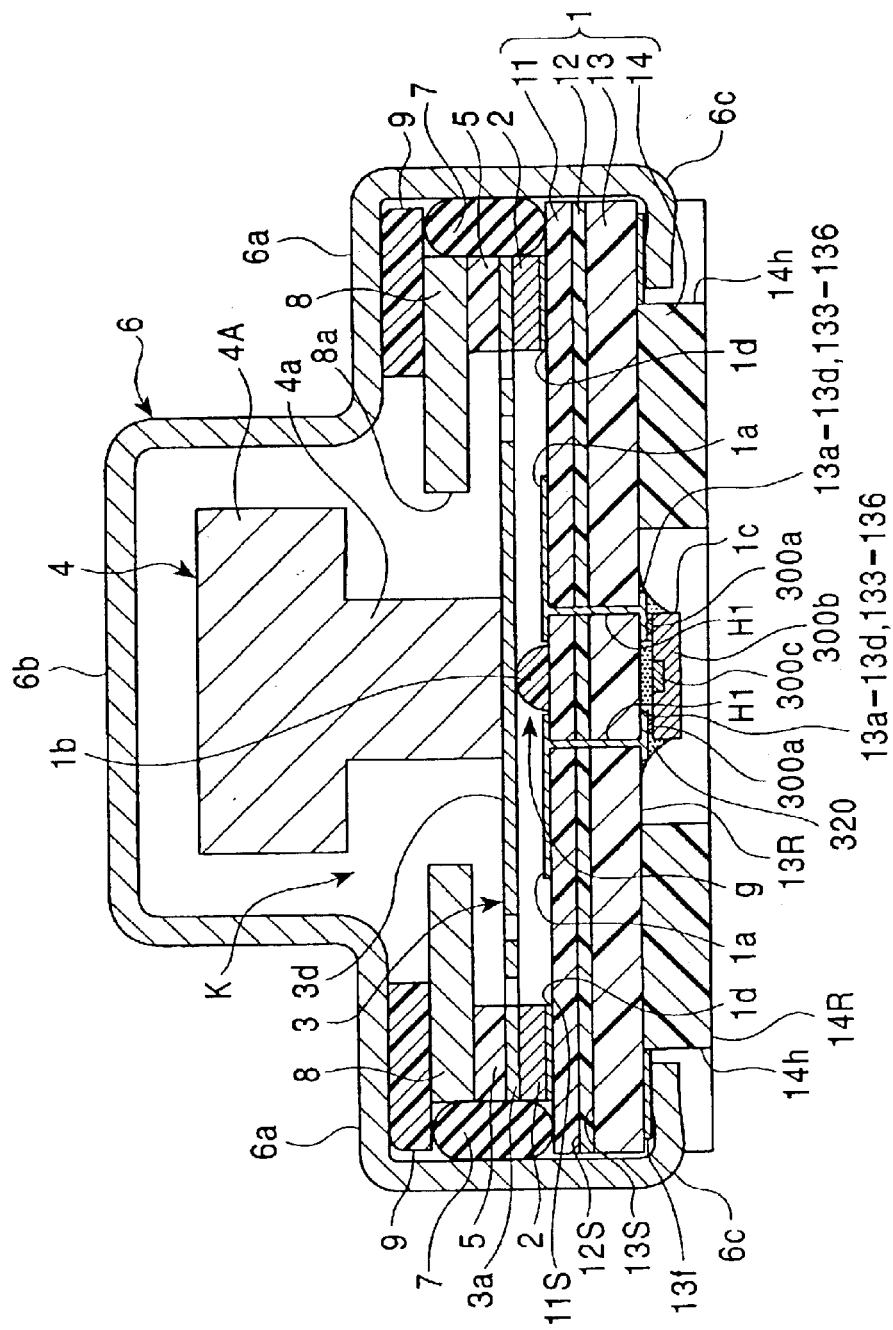
FIG. 13 is a schematic sectional view corresponding to FIG. 2, showing the overall construction of a capacitive sensor according to a sixth embodiment of the present invention.
Figure 14:
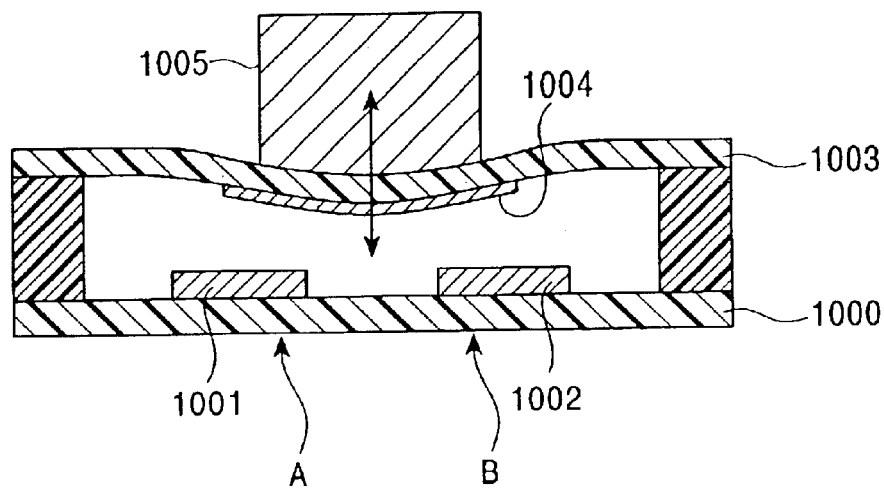
FIG. 14 is a schematic diagram showing the construction of a known capacitive sensor.

Next, a capacitive sensor according to a sixth embodiment of the present invention will be described below with reference to FIG. 13. The present embodiment is suitably applied to a case in which the sensor will not be turned over. The sensor according to the present embodiment is constructed similarly to that of the first embodiment, but the height of the convex portion 1b is set to be the same as the total thickness of the spacer 2 on which the retaining portion 3a is disposed and the electrode id, so that the retaining plate 3 is not deflected when the sensor is not tilted (that is, when the sensor is in the horizontal position). Other constructions are similar to those of the first embodiment, and explanations thereof are thus omitted.

Accordingly, effects obtained by the first embodiment can also be obtained by the present embodiment as long as the sensor is not tilted by an extremely large amount. For example, the movable portion 3d can be prevented from being displaced in the vertical direction due to the weight of the weight 4. In addition, since the retaining plate 3 is not deflected while the sensor is in an untilted state, the durability of the sensor can be improved.

The present invention is not limited to the above-described embodiments, and various modifications are possible within the scope of the present invention.

For example, a plurality of fixed electrodes 1a are arranged such that they face a single movable electrode constructed of the movable portion 3d in the above-described embodiments. Alternatively, however, a single fixed electrode may be arranged such that it faces a plurality of movable electrodes. More specifically, a single electrode may be formed on the board 1, and a plurality of (for example, four) movable electrodes may be formed on the bottom surface of an insulating movable portion. In addition, a plurality of fixed electrodes and a plurality of movable electrodes may also be arranged such that they face each other.

In addition, although the movable portion 3d can rotate around two axes which are perpendicular to each other in the above-described embodiments, the construction may also be such that the movable portion only rotates around a single axis.

In addition, in the above-described embodiments, the retaining plate 3 is not limited to a metal plate, and any one of a metal plate, a semiconductor plate, and an insulating plate may be used as long as it is flexible and flat. The thickness of the retaining plate 3 is also not limited, and a film (or membrane) whose thickness is 10 μm or less may also be used. For example, a polymeric film composed of polyimide or the like, a metal film, a thin silicon substrate whose thickness is reduced by etching, etc., may be suitably used. When the retaining plate 3 is composed of an insulating material such as polyimide, a conductive film (movable electrode) composed of copper or the like must be formed on the surface of the retaining plate 3 which faces the board 1.

In addition, it is not necessary to form the convex portions 1b, the convex portion 3g, and the projection 4b, which serve as the retaining element, integrally with the board 1, the movable portion 3d, and the weight 4, respectively, and they may also be formed by adhering a separate component.

In addition, in the above-described first to sixth embodiments, the movable portion 3d is prevented from being deflected toward the board 1 by the convex portion 1b which projects from the board 1 toward the movable portion 3d, the convex portion 3g which projects from the movable portion 3d toward the board 1, or the projection 4b which projects from the weight 4 toward the board 1. In the present invention, any one of these structures can be selected arbitrarily.

In addition, although the tilt sensor is explained as an example of a capacitive sensor in the above-described embodiments, the present invention is not limited to tilt sensors, and may also be applied to, for example, acceleration sensors, impact sensors, etc.

What is claimed is:

1. A capacitive sensor comprising:
    a fixed board provided with a fixed electrode unit consisting of one or more electrodes;
    a movable member provided with a movable electrode unit consisting of one or more electrodes which faces the fixed electrode unit with a gap therebetween, the movable member being rotatable with respect to the fixed board;
    a weight provided on the movable member; and
    a retaining element which is disposed between the fixed board and the weight and retains the movable member in a rotatable manner, the retaining element being positioned so as to maintain the gap constant,
    wherein at least one of the movable electrode unit and the fixed electrode unit includes a plurality of electrodes, and
    wherein capacitances between the one or more electrodes of the movable electrode unit and the one or more electrodes of the fixed electrode unit change in accordance with the movement of the movable member.

2. A capacitive sensor according to claim 1, wherein the retaining element is formed integrally with the fixed board.

3. A capacitive sensor according to claim 2, wherein the movable member has a concave portion for receiving an end portion of the retaining element at a position where the movable member is in contact with the retaining element.

4. A capacitive sensor according to claim 1, wherein the retaining element is formed integrally with the weight.

5. A capacitive sensor according to claim 4, wherein the fixed board has a concave portion for receiving an end portion of the retaining element at a position where the fixed board is in contact with the retaining element.

6. A capacitive sensor according to claim 1, wherein the retaining element is formed integrally with the movable member.

7. A capacitive sensor according to claim 6, wherein the fixed board has a concave portion for receiving an end portion of the retaining element at a position where the fixed board is in contact with the retaining element.

8. A capacitive sensor according to claim 1, wherein the movable member is biased in a direction away from the fixed board by the retaining element.

9. A capacitive sensor according to claim 8, further comprising a retaining member which retains the movable member and a plurality of flexible connecting members which connect the movable member to the retaining member.

10. A capacitive sensor according to claim 9, wherein the retaining member is placed on the fixed board.

11. A capacitive sensor according to claim 10, wherein the retaining member, the connecting members, and the movable member are composed of a conductive material, and
    wherein a connecting electrode is provided on the fixed board and the retaining member is placed on the connecting electrode with or without a metal spacer therebetween.

12. A capacitive sensor according to claim 10, further comprising a cover which covers the peripheral region of the fixed board and which pushes the retaining member toward the fixed board.

13. A capacitive sensor according to claim 12, further comprising a packing which is disposed between the cover and the fixed board.

14. A capacitive sensor according to claim 1, further comprising a retaining member which retains the movable member and a spacer disposed between the fixed board and the retaining member,
    wherein the height of the retaining element is greater than the sum of the thickness of the fixed electrode unit and the thickness of the spacer, so that the movable member is biased in a direction away from the fixed board by the retaining element.

15. A capacitive sensor comprising:
    a fixed board provided with a fixed electrode unit consisting of one or more electrodes;
    a movable member provided with a movable electrode unit consisting of one or more electrodes which aces the fixed electrode unit with a gap therebetween, the movable member being rotatable with respect to the fixed board;
    a weight provided on the movable member; and
    a retaining element which is disposed between the fixed board and the weight and retains the movable member in a rotatable manner,
    wherein at least one of the movable electrode unit and the fixed electrode unit includes a plurality of electrodes,
    wherein capacitances between the one or more electrodes of the movable electrode unit and the one or more electrodes of the fixed electrode unit change in accordance with the movement of the movable member,
    wherein the retaining element is formed integrally with the fixed board, and
    wherein the movable member has a concave portion for receiving an end portion of the retaining element at a position where the movable member is in contact with the retaining element.

16. A capacitive sensor comprising:

a fixed board provided with a fixed electrode unit consisting of one or more electrodes;

a movable member provided with a movable electrode unit consisting of one or more electrodes which faces the fixed electrode unit with a gap therebetween, the movable member being rotatable with respect to the fixed board;

a weight provided on the movable member; and a retaining element which is disposed between the fixed board and the weight and retains the movable member in a rotatable manner, wherein at least one of the movable electrode unit and the fixed electrode unit includes a plurality of electrodes, wherein capacitances between the one or more electrodes of the movable electrode unit and the one or more electrodes of the fixed electrode unit change in accordance with the movement of the movable member, wherein the retaining element is formed integrally with the weight, and wherein the fixed board has a concave portion for receiving an end portion of the retaining element at a position where the fixed board is in contact with the retaining element.

17. A capacitive sensor comprising:

a fixed board provided with a fixed electrode unit consisting of one or more electrodes;

a movable member provided with a movable electrode unit consisting of one or more electrodes which faces the fixed electrode unit with a gap therebetween, the movable member being rotatable with respect to the fixed board;

a weight provided on the movable member; and a retaining element which is disposed between the fixed board and the weight and retains the movable member in a rotatable manner, wherein at least one of the movable electrode unit and the fixed electrode unit includes a plurality of electrodes, wherein capacitances between the one or more electrodes of the movable electrode unit and the one or more electrodes of the fixed electrode unit change in accordance with the movement of the movable member, wherein the retaining element is formed integrally with the movable member, and wherein the fixed board has a concave portion for receiving an end portion of the retaining element at a position where the fixed board is in contact with the retaining element.

18. A capacitive sensor comprising:

a fixed board provided with a fixed electrode unit consisting of one or more electrodes;

a movable member provided with a movable electrode unit consisting of one or more electrodes which faces the fixed electrode unit with a gap therebetween, the movable member being rotatable with respect to the fixed board;

a weight provided on the movable member; and a retaining element which is disposed between the fixed board and the weight and retains the movable member in a rotatable manner;

wherein at least one of the movable electrode unit and the fixed electrode unit includes a plurality of electrodes, wherein capacitances between the one or more electrodes of the movable electrode unit and the one or more electrodes of the fixed electrode unit change in accordance with the movement of the movable member, wherein the movable member is biased in a direction away from the fixed board by the retaining element, wherein the capacitive sensor further comprises a retaining member which retains the movable member and a plurality of flexible connecting members which connect the movable member to the retaining member, wherein the retaining member is placed on the fixed board, wherein the retaining member, the connecting members, and the movable member are composed of a conductive material, and wherein a connecting electrode is provided on the fixed board and the retaining member is placed on the connecting electrode with or without a metal spacer therebetween.

19. A capacitive sensor comprising:

a fixed board provided with a fixed electrode unit consisting of one or more electrodes;

a movable member provided with a movable electrode unit consisting of one or more electrodes which faces the fixed electrode unit with a gap therebetween, the movable member being rotatable with respect to the fixed board;

a weight provided on the movable member; and a retaining element which is disposed between the fixed board and the weight and retains the movable member in a rotatable manner, wherein at least one of the movable electrode unit and the fixed electrode unit includes a plurality of electrodes, wherein capacitances between the one or more electrodes of the movable electrode unit and the one or more electrodes of the fixed electrode unit change in accordance with the movement of the movable member, wherein the movable member is biased in a direction away from the fixed board by the retaining element, wherein the capacitive sensor further comprises a retaining member which retains the movable member and a plurality of flexible connecting members which connect the movable member to the retaining member, wherein the retaining member is placed on the fixed board, and wherein the capacitive sensor further comprises a cover which covers the peripheral region of the fixed board and which pushes the retaining member toward the fixed board.

20. A capacitive sensor according to claim 19, further comprising a packing which is disposed between the cover and the fixed board.

* * * * *